US009167515B2

(12) United States Patent  
Singh et al.

(10) Patent No.: US 9,167,515 B2  
(45) Date of Patent: Oct. 20, 2015

(54) OPERATION METHOD IN HETEROGENEOUS NETWORKS AND GATEWAY AND WIRELESS COMMUNICATION DEVICE USING THE SAME

(75) Inventors: Shubhranshu Singh, Hsinchu County (TW); Kuei-Li Huang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 418 days.

(21) Appl. No.: 13/407,770

(22) Filed: Feb. 29, 2012

(65) Prior Publication Data

US 2013/0163491 A1 Jun. 27, 2013

(30) Foreign Application Priority Data

Dec. 27, 2011 (TW) .............................. 100148946 A

(51) Int. Cl.
*H04B 7/212* (2006.01)
*H04W 52/02* (2009.01)
(Continued)

(52) U.S. Cl.
CPC .......... *H04W 52/0216* (2013.01); *H04W 16/14* (2013.01); *H04B 7/2656* (2013.01); *H04W 4/005* (2013.01); *H04W 76/048* (2013.01); *H04W 88/16* (2013.01); *Y02B 60/50* (2013.01)

(58) Field of Classification Search
CPC ............ H04W 88/16; H04W 56/00–56/0025; H04W 74/08–74/0808; H04W 74/0833; H04W 74/085; H04W 74/0883; H04W 92/04
USPC ............ 370/310–350, 395.62, 503–520, 401; 455/454
See application file for complete search history.

(56) References Cited

U.S. PATENT DOCUMENTS 7,830,844 B2 11/2010 Todd et al.
2007/0159301 A1* 7/2007 Hirt et al. ..................... 340/10.1
(Continued)

FOREIGN PATENT DOCUMENTS

| CN | 102017540 | 4/2011 |
| TW | 201105155 | 2/2011 |
| WO | 2010027332 | 3/2010 |
| WO | 2011082150 | 7/2011 |

OTHER PUBLICATIONS

"Office Action of Taiwan Counterpart Application", issued on Dec. 15, 2014, p. 1-p. 6.

(Continued)

*Primary Examiner* — Andrew Chriss
*Assistant Examiner* — Kenan Cehic
(74) *Attorney, Agent, or Firm* — Jianq Chyun IP Office

(57) ABSTRACT

An operation method in heterogeneous networks, and a gateway and a wireless communication device using the same are disclosed. The operation method in heterogeneous networks includes followings. When a gateway, connecting a first communication network and a second communication network, operates in a beacon mode, the gateway determines whether the first communication network is in an allowed period or a forbidden period, and generates a determination result. Then, the gateway adaptively adjusts a ratio of a superframe duration to a beacon interval of a periodic beacon of the second communication network according to the determination result. In addition, the gateway is connected to a M2M communication server via the first communication network, and the gateway is connected to at least one M2M communication device via the second communication network.

17 Claims, 17 Drawing Sheets

(51) Int. Cl.
  *H04W 16/14*   (2009.01)
  *H04W 88/16*   (2009.01)
  *H04B 7/26*    (2006.01)
  *H04W 76/04*   (2009.01)
  *H04W 4/00*    (2009.01)

(56) References Cited

U.S. PATENT DOCUMENTS

| | | | |
|---|---|---|---|
| 2010/0061271 A1* | 3/2010 | Seyedi-Esfahani et al. | 370/254 |
| 2010/0074117 A1  | 3/2010 | Du et al. | |
| 2010/0090829 A1  | 4/2010 | Pujol | |
| 2010/0157914 A1* | 6/2010 | Kim et al. | 370/329 |
| 2012/0106423 A1* | 5/2012 | Nylander et al. | 370/311 |
| 2012/0214502 A1* | 8/2012 | Qiang | 455/453 |
| 2012/0230178 A1* | 9/2012 | Wang et al. | 370/216 |

OTHER PUBLICATIONS

Medagliani et al., "Hybrid ZigBee-RFID Networks With Highest Energy Efficiency", http://www.techrepublic.com/whitepapers/hybrid-zigbee-rfid-networks-with-highest-energy-efficiency/3560299, Jun. 2008, p. 1-20.
3GPP TR 23.888 draft, version 1.3.0., Jun. 2011, p. 1-130.
ZigBee Specification, Jan. 17, 2008, p. 1-604.
Part 15.4: Wireless Medium Access Control (MAC) and Physical Layer (PHY) Specifications for Low-Rate Wireless Personal Area Networks (WPANs), 2006, p. 1-323.
Park et al., "Power Saving Algorithms for Wireless Sensor Networks on IEEE 802.15.4", IEEE Communications Magazine, Jun. 2006, p. 148-155.
Kim et al., "Energy Efficient Traffic scheduling in IEEE 802.15.4 for Home Automation Networks", IEEE Transactions on Consumer Electronics, vol. 53, Issue: 2, 2007, p. 369-374.
Fotouhi Ghazvini et al., "Energy Efficiency in MAC IEEE 802.15.4 for Wireless Sensor Networks", IEEE 2008 National Conference on Tele-communication Technologies, Aug. 26-27, 2008, p. 289-294.
Huang et al., "A Comprehensive analysis of Low-power operation for beacon enabled IEEE 802.15.4 Wireless networks",. IEEE Transactions on Wireless Communications, vol. 8, No. 11, Nov. 2009, p. 5601-5611.

* cited by examiner

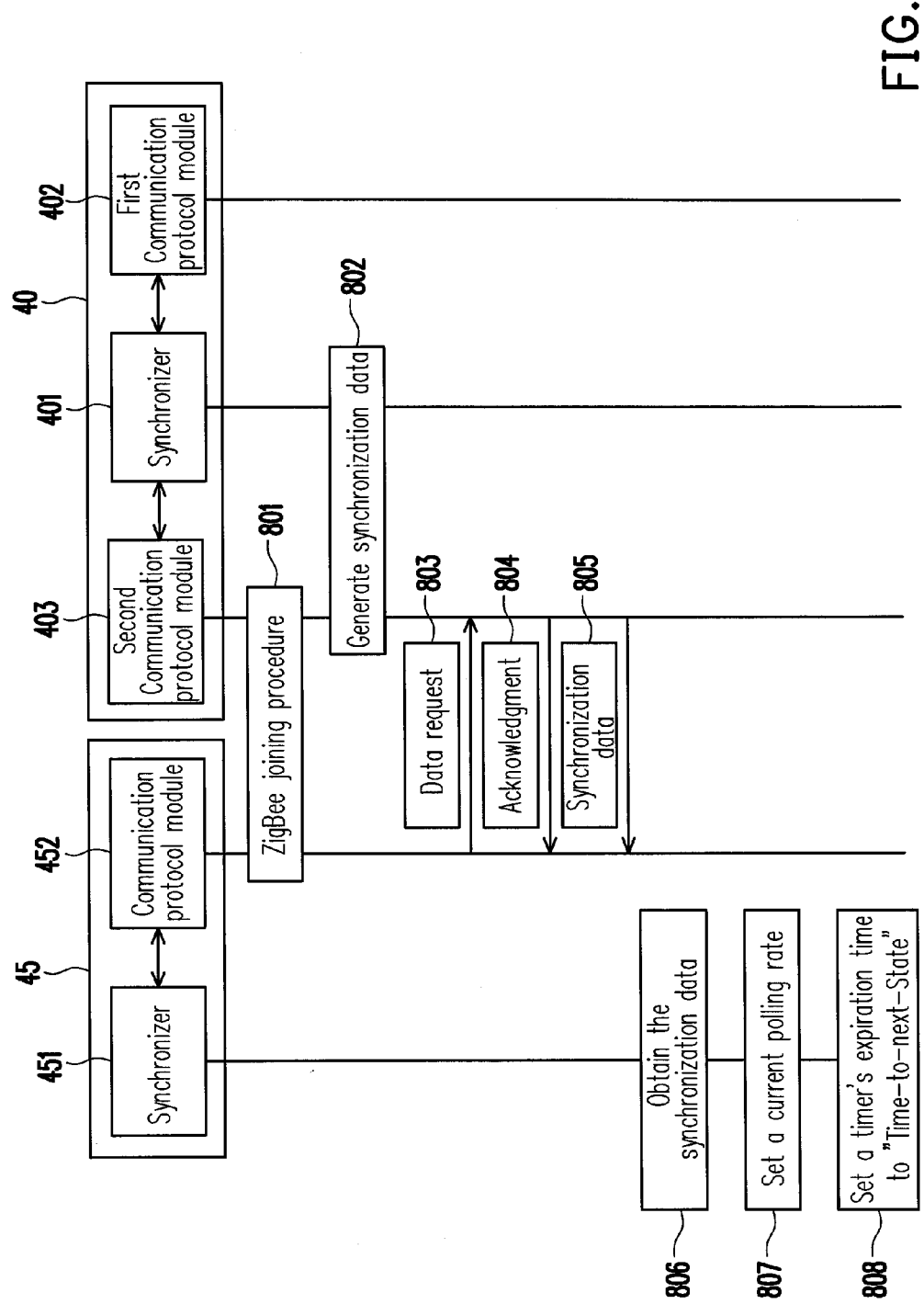

OPERATION METHOD IN HETEROGENEOUS NETWORKS AND GATEWAY AND WIRELESS COMMUNICATION DEVICE USING THE SAME

CROSS-REFERENCE TO RELATED APPLICATION

This application claims the priority benefit of Taiwan application serial no. 100148946, filed Dec. 27, 2011. The entirety of the above-mentioned patent application is hereby incorporated by reference herein and made a part of this specification.

BACKGROUND

1. Technical Field

The disclosure relates to an operation method for implementing machine-to-machine (M2M) communication in heterogeneous networks, and a gateway and a wireless communication device using the same.

2. Related Art

Currently, the development of a machine-to-machine (M2M) communication system adopts architecture of heterogeneous networks, so as to improve the communication efficiency of the M2M communications application. The M2M communication may also be referred to as machine type communication (MTC). FIG. 1 is a schematic diagram illustrating system deployment of an M2M communication application. As shown in FIG. 1, the M2M communication system 10 includes at least one M2M server 11, at least one M2M user 12, an access network 13, and a plurality of M2M gateways 14a, 14b, . . . , 14n. The M2M server 11 and the M2M user 12 are connected to each other via a communication network and an application program interface (API). The M2M server 11 may be disposed in the access network 13, and may also be disposed in the Internet and is connected to the M2M gateways 14a, 14b, . . . , 14n via the access network 13.

Referring to FIG. 1 again, each of the M2M gateways 14a, 14b, . . . , 14n supports more than two communication protocols at the same time, and is connected to the access network 13 and a local wireless communication network respectively. The local wireless communication network may support IEEE 802.11 standard, IEEE 802.15.4 standard, WiFi standard, bluetooth standard, or ZigBee wireless communication protocol standard (abbreviated as ZigBee hereinafter). The access network 13 may be a wired communication network or wireless access network supporting a power saving mode, so as to decrease a portion of power consumption of the M2M gateways 14a, 14b, . . . , 14n. When the access network 13 is the wireless access network, the access network 13 may support, for example, 3GPP LTE wireless communication standard, IEEE 802.16 standard, or other wireless access network standards. Each of the M2M gateways 14a, 14b, . . . , 14n is connected to M2M nodes via the local wireless communication network, for example, the M2M gateway 14n is connected to a plurality of M2M nodes 15a, 15b, . . . , 15n. The M2M nodes 15a, 15b, . . . , 15n are connected to the M2M server 11 via the M2M gateway 14n serving as an agent, and transmit captured data to the M2M server 11, or receive an instruction message from the M2M server 11. The M2M user 12 may access data of the M2M nodes via the M2M server 11. The access network 13 provides a wide-area communication capability to the M2M gateways 14a, 14b, . . . , 14n, and each of the M2M gateways 14a, 14b, . . . , 14n provides a small-range (or short-distance) communication capability to the served M2M nodes.

However, the access network 13 and the local wireless communication network (for example, a wireless communication network 15) of each of the M2M gateways 14a, 14b, . . . , 14n have different power saving cycles, which are asynchronous in most cases. Two examples are illustrated below through FIG. 2 and FIG. 3. In addition, for the access network 13, the local wireless communication network 15 may also be referred to as a capillary network.

FIG. 2 is a schematic diagram illustrating non-synchronized power saving cycles of heterogeneous networks. To be illustrated more clearly, FIG. 2 shows non-synchronized power saving cycles resulted by mis-alignment between communication windows of an LTE network and a ZigBee network. Referring to FIG. 2, similar to the architecture of heterogeneous networks in FIG. 1, the access network 13 is an LTE network in this case, the M2M server 11 is disposed in the LTE network 13, and the power saving cycle of the LTE network 13 includes two stages: an allowed period and a forbidden period. To be illustrated more clearly, the allowed period follows a periodic or non-periodic tracking area update (TAU), and the forbidden period follows the allowed period. For example, the allowed period follows the TAUs 211, 212, and the occurrence of the TAUs 212, 213 represents the ending of the previous forbidden period. In the allowed period, the LTE network 13 may transmit a signal to the M2M gateway 14n, or receive an uplink signal of the M2M gateway 14n, but in the forbidden period, the LTE network 13 does not process the signal of the M2M gateway 14n. As shown in FIG. 2, signal transmission 251 is processed by the LTE network 13 in the allowed period, but signal transmission 253 occurs in the forbidden period, and thus is not processed. The M2M gateway 14n should wait until the next TAU 212 is received, so as to perform uplink signal transmission or receive downlink signal transmission in the next allowed period.

The wireless communication protocol between the M2M gateway 14n and the M2M node (or referred to as an M2M device) 15n has a power saving cycle different from that of the LTE network 13, and the power saving cycle includes: an active period and a sleep period, which are not completely aligned with the allowed period and the forbidden period of the LTE network 13. The wireless communication network 15 is a ZigBee network in this case, and the M2M device 15n is disposed in the ZigBee network 15. Therefore, as shown in FIG. 2, the downlink signal originally transmitted by the M2M server 11 to the M2M gateway 14n via the signal transmission 251 in the allowed period cannot be transmitted to the M2M device 15n via the signal transmission 252 in the sleep period, thereby generating delay of signal transmission. Likewise, as for the uplink signal transmitted by the M2M device 15n via the signal transmission 254 in the active period, the corresponding LTE network 13 is still in the forbidden period, so the M2M gateway 14n cannot transmit the signal continuously to the M2M server 11 via the signal transmission 253. The M2M gateway 14n should wait until the allowed period after the next TAU 212 to transmit the uplink signal to the M2M server 11, and therefore, the delay of the signal transmission or unnecessary transmission power consumption is generated.

FIG. 3 is a schematic diagram illustrating non-synchronized power saving cycles of heterogeneous networks due to non-periodic signals. To be illustrated more clearly, FIG. 3 shows the non-synchronize power saving cycles of an LTE network and a ZigBee network, where the power saving cycle of the LTE network may be changed due to non-periodic TAU. Referring to FIG. 3, similar to the heterogeneous networks signal transmission in FIG. 2, but a next TAU 312 after a TAU 311 shown in FIG. 3 is a non-periodic TAU (for example, the M2M gateway 14n is handed over to a new tracking area), and occurs earlier than the time point of a next periodic TAU expected by the M2M gateway 14n. Therefore, the power saving cycles that are originally slightly synchronized become non-synchronized now, and the downlink signal originally transmitted by the LTE network 13 via the signal transmission 352 in the allowed period encounters the sleep period of the ZigBee network 15 at the M2M gateway 14n, so the downlink signal cannot be transmitted to the M2M server 11 directly by the M2M gateway 14n. After the non-periodic TAU 312, the M2M gateway 14n may know that it is switched to a new allowed period, and therefore, the uplink signal may be transmitted via signal transmission 352 to the M2M server 11. It is assumed that the M2M gateway 14n does not attempt to synchronize the power saving cycles of the two heterogeneous networks, when the ZigBee network 15 is in the active period, the LTE network 13 is adjusted to the forbidden period due to the non-periodic TAU 312, and if the M2M gateway 14n predicts the allowed period by using the periodic TAU, likewise, the transmission signal 353, after the uplink signal transmission of the signal transmission 354 from the M2M device 15n, cannot be transmitted from the M2M gateway 14n to the M2M server 11 successfully by the LTE network 13 due to the encountered forbidden period.

When the power saving cycles of the wide-area access network 13 and the local wireless communication network are asynchronous, unnecessary transmission power consumption, or even delay of M2M communication, may be resulted. Therefore, how to enable the power saving cycles of heterogeneous networks supporting the M2M communication to be synchronized, is a major issue in this industry.

SUMMARY

The disclosure provides an exemplary embodiment of an operation method in heterogeneous networks. According to the exemplary embodiment, the operation method in heterogeneous networks is applicable to a gateway connecting a first communication network and a second communication network, and includes followings: when gateway operates in a beacon mode of the second communication network, the gateway determines whether the first communication network is in an allowed period or a forbidden period, and generates a determination result; the gateway, according to the determination result, adaptively adjusts a ratio of a superframe duration to a beacon interval of a periodic beacon of the second communication network; where, the gateway is connected to an M2M communication server via the first communication network, and the gateway is connected to at least one M2M communication device via the second communication network.

The disclosure provides an exemplary embodiment of an operation method in heterogeneous networks. According to the exemplary embodiment, the operation method in heterogeneous networks is applicable to a gateway connecting a first communication network and a second communication network, and the method for operating an M2M communication device in heterogeneous networks includes the followings: when the gateway operates in a non-beacon mode of the second communication network, the gateway determines whether the first communication network is in an allowed period or a forbidden period, and generates a determination result; the gateway, according to the determination result, adaptively adjusts a polling rate of at least one M2M communication device of the second communication network; where, the gateway is connected to an M2M communication server via the first communication network, and gateway is connected to the at least one M2M communication device via the second communication network.

The disclosure provides an exemplary embodiment of a gateway. According to the exemplary embodiment, the gateway is applicable to connecting a first communication network and at least one M2M communication device of a second communication network, and the gateway includes: a first communication protocol module, a second communication protocol module and a synchronizer. The first communication protocol module is connected to the first communication network, and is connected to an M2M communication server via the first communication network. The second communication protocol module is connected to the second communication network. The synchronizer is connected to the first communication protocol module and the second communication protocol module, and is configured for determining whether the first communication network is in an allowed period or a forbidden period, and adaptively adjust, via the second communication protocol module, a ratio of a superframe duration to a beacon interval of a periodic beacon of the second communication network, or adaptively adjust a polling rate of the at least one M2M communication device of the second communication network according to the determination result, via the second communication protocol module.

The disclosure provides an exemplary embodiment of a wireless communication device. According to the exemplary embodiment, the wireless communication device includes: a communication protocol module and a synchronizer. The communication protocol module is connected to a gateway of a communication network. The synchronizer is connected to the communication protocol module, and is configured to update a local polling rate according to synchronization data transmitted by the gateway.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 8 is a flowchart illustrating transiting from a joining state to a power saving (PS) state/active state in a non-beacon mode according to a first exemplary embodiment of the disclosure.

DETAILED DESCRIPTION OF DISCLOSED EMBODIMENTS

Figure 1:
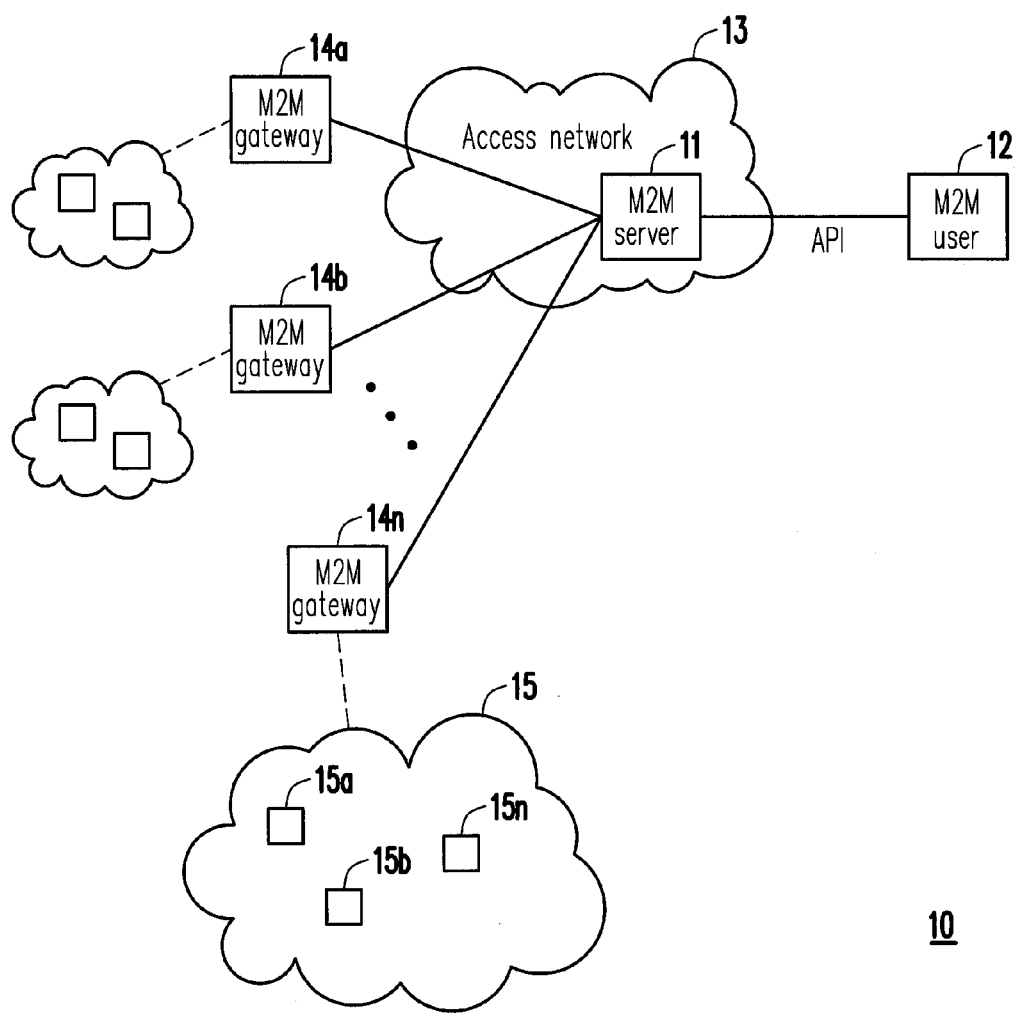
FIG. 1 is a schematic diagram illustrating system deployment of an M2M communication application.
Figure 2:
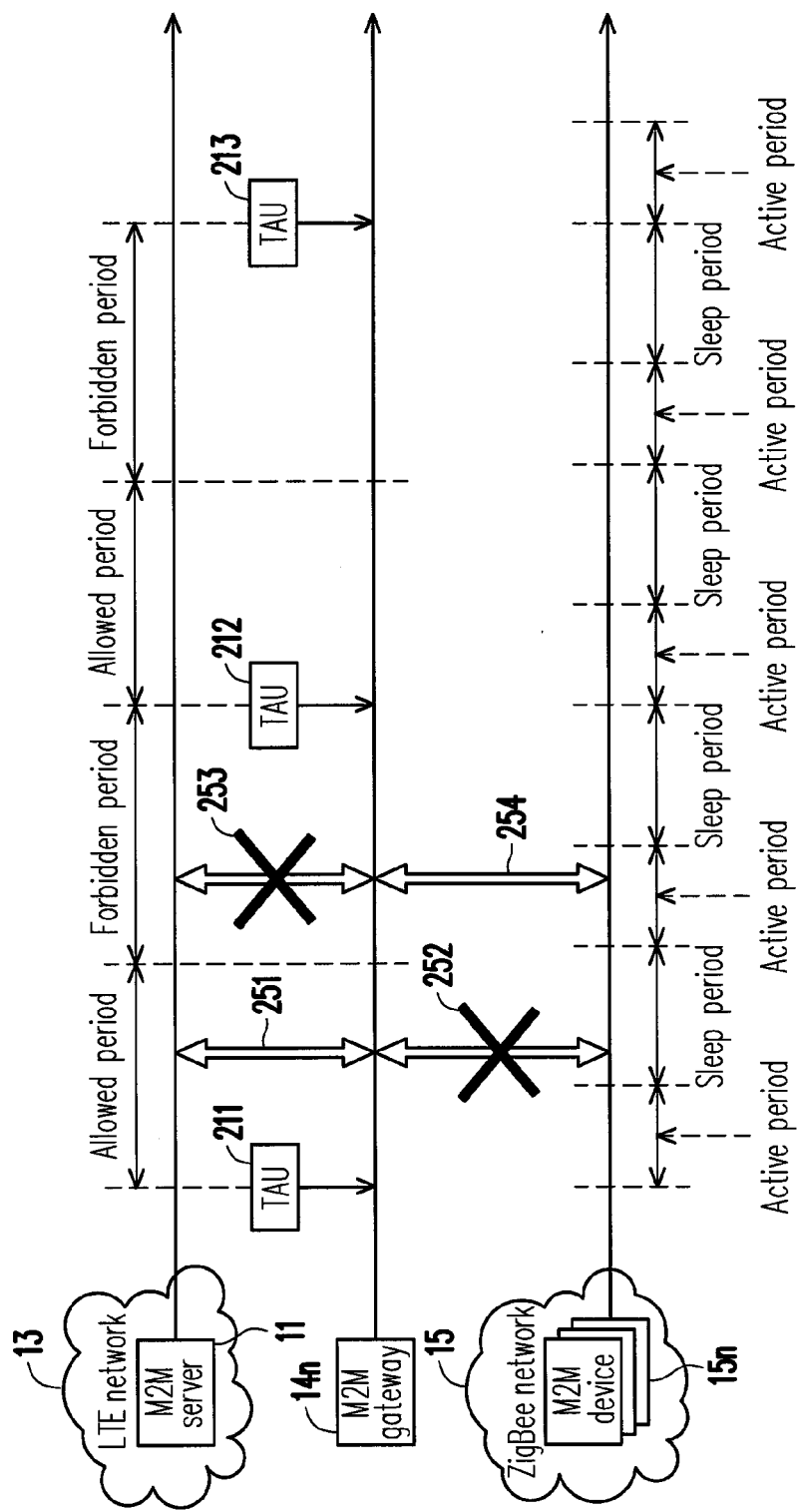
FIG. 2 is a schematic diagram illustrating asynchronism of power saving cycles of heterogeneous networks.
Figure 3:
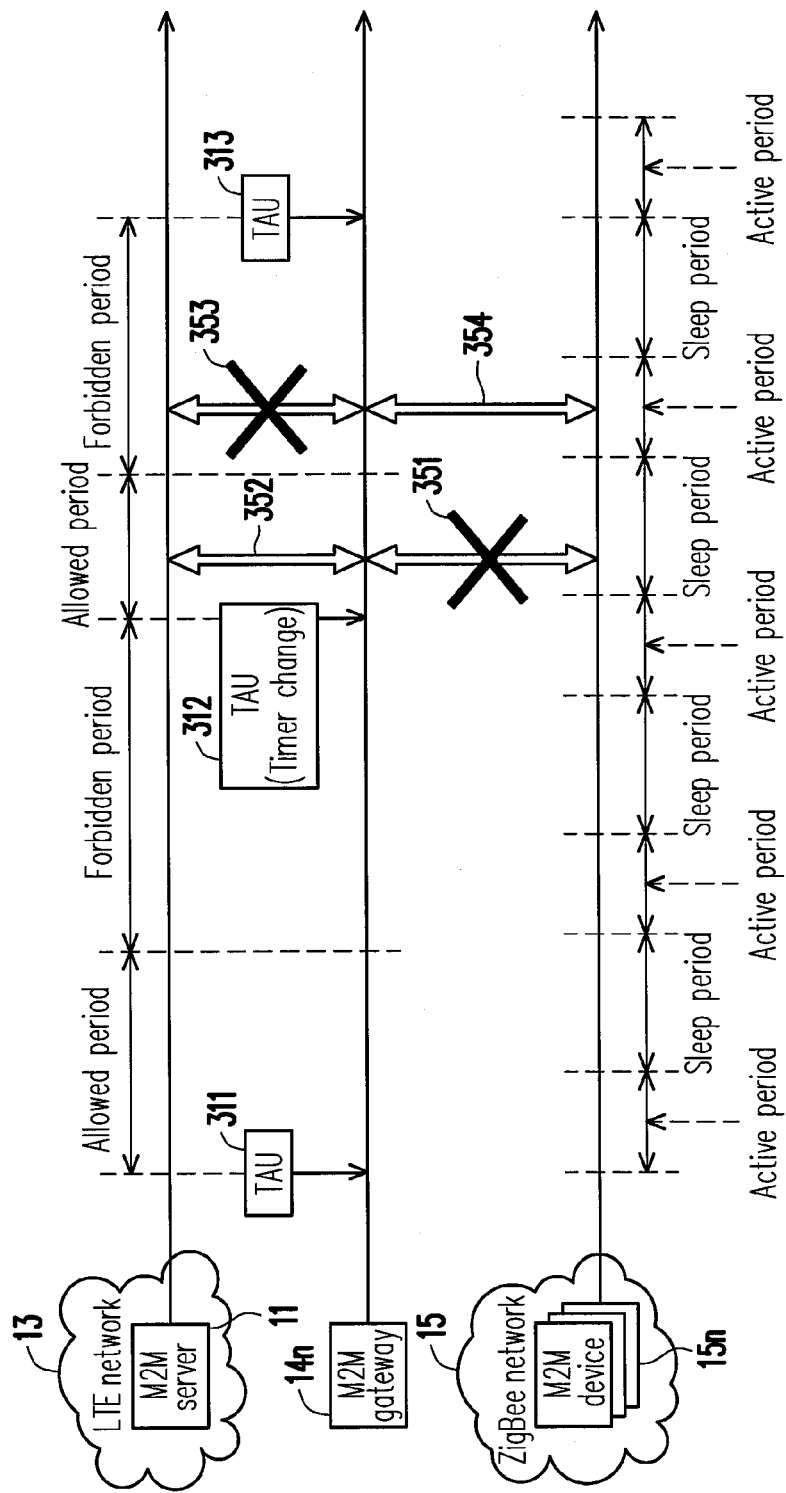
FIG. 3 is a schematic diagram illustrating non-synchronized power saving cycles of heterogeneous networks due to non-periodic signals.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

The disclosure provides a method for synchronizing power saving cycles of heterogeneous networks at two sides of a gateway. By synchronizing power saving cycles of two heterogeneous networks, transmission power consumption of a machine-to-machine (M2M) node (or referred to as an M2M device) and an M2M gateway might be decreased, and transmission delay for performing M2M communication between the M2M device and the M2M server might also be decreased. The technical content of the disclosure is illustrated mainly by taking an LTE network and an ZigBee network as the heterogeneous networks, but possible implementation of the present disclosure is not limited to the LTE network and the ZigBee network, and the present disclosure can be implemented in a scenario where a local wireless communication network works together with a wired wide-area network or wireless wide-area network supporting power saving mode.

By taking an M2M communication system 10 shown in FIG. 1 as an example, signal transmission between an M2M gateway 14n and an M2M node (or referred to as an M2M device) 15n is implemented by using a ZigBee network communication protocol. That is to say, a local wireless communication network of the M2M gateway 14n supports the ZigBee network communication protocol. Correspondingly, signal transmission between the M2M gateway 14n and an access network 13 is implemented by using an LTE network communication protocol. The ZigBee network communication protocol supports two operation modes: a beacon mode and a non-beacon mode.

Figure 4A:
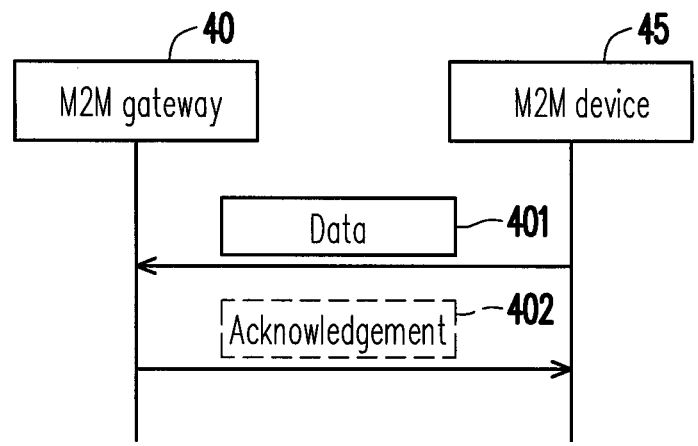
FIG. 4A is a schematic diagram illustrating an M2M communication device transmitting an uplink data signal in a non-beacon mode.

FIG. 4A is a schematic diagram illustrating an M2M device transmitting uplink data signal in a non-beacon mode. The non-beacon mode may be referred to a ZigBee communication protocol specification or an IEEE 802.15.4 specification. Referring to FIG. 4A, an M2M gateway 40 may also be called a coordinator, which could be configured for coordinating transmitting uplink signals and receiving downlink signals of a plurality of M2M devices in the local ZigBee network. Referring to FIG. 4A, in a non-beacon mode, no broadcast beacon exists, by taking an M2M device 45 as an example, when the M2M device 45 intends to transmit M2M signal to a corresponding M2M server, after Carrier Sense Multiple Access with Collision Avoidance (CSMA-CA), the M2M device 45 directly transmits data signal to the M2M gateway 40 (step 401). When necessary, the M2M gateway 40 may, in response to the data signal transmitted by the M2M device 45, respond Acknowledgment (ACK) signal to the M2M device 45 (step 402).

Figure 4B:
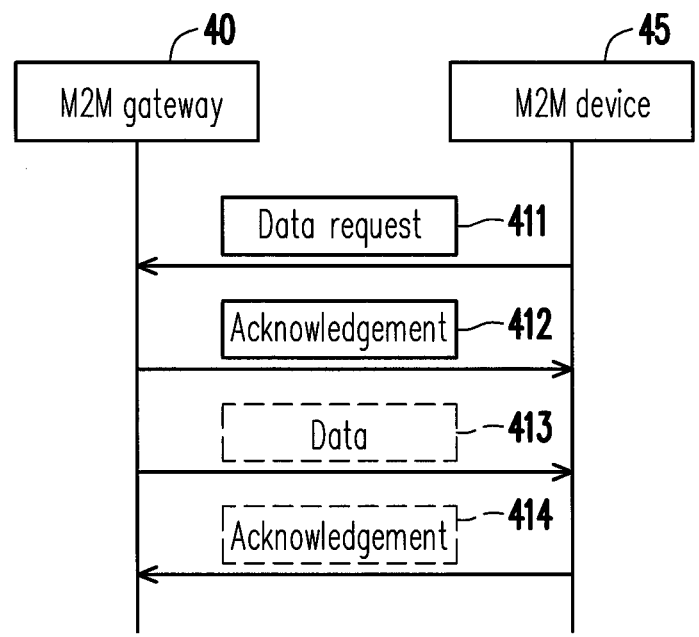
FIG. 4B is a schematic diagram illustrating an M2M communication device receiving a downlink data signal in a non-beacon mode.

FIG. 4B is a schematic diagram of an M2M device receiving downlink data signal in a non-beacon mode. Since there exists no broadcast beacon, so each M2M device may poll a corresponding M2M server periodically. That is, each M2M device may send data request signal to the corresponding M2M server, so as to determine whether data or a downlink signal designated to the M2M device exists or not. By taking the M2M device 45 as an example, the M2M device 45 firstly transmits data request signal to the M2M gateway 40 (step 411); when the M2M gateway 40 has data or downlink signal designated to be transmitted to the M2M device 45, the M2M gateway 40 may, in response to the data request signal transmitted by the M2M device 45, respond ACK signal to the M2M device 45 (step 412), and the ACK signal carries a configuration flag, so as to notify the M2M device 45 that the M2M device 45 will receive the data or downlink signal; then, the M2M gateway 40 transmits the data or downlink signal to the M2M device 45 (step 413), and the M2M device 45, in response to the received data or the received downlink signal, responds ACK signal to the M2M gateway 40. When the M2M gateway 40 determines that no data or downlink signal is designated to be transmitted to the M2M device 45, the M2M gateway 40 performs the step 412 to respond ACK signal to the M2M device 45, so as to notify the M2M device 45 that no data or downlink signal exists, but the subsequent step 413 to step 414 are not performed.

After illustrating the signal transmission in the non-beacon mode, the present disclosure provides a method of operating an M2M communication device in heterogeneous networks, also referred to as an operation method in heterogeneous networks. The main operation concept is that, in a non-beacon mode, according to whether an access network (for example, an LTE network) connected to the M2M gateway 40 is currently in an allowed period or forbidden period of a power saving cycle, adaptively adjust a polling rate of a local wireless communication network (for example, a Zigbee network). In the non-beacon mode, during the allowed period of the LTE network, the method of operating the M2M communication device in the heterogeneous networks increases the polling rate of the M2M device in the Zigbee network. In contrast, during the forbidden period of the LTE network, the LTE network does not necessarily process the transmission of the M2M gateway, so the method of operating the M2M communication device in the heterogeneous networks decrease the polling rate of the M2M device in the Zigbee network.

Figure 5:
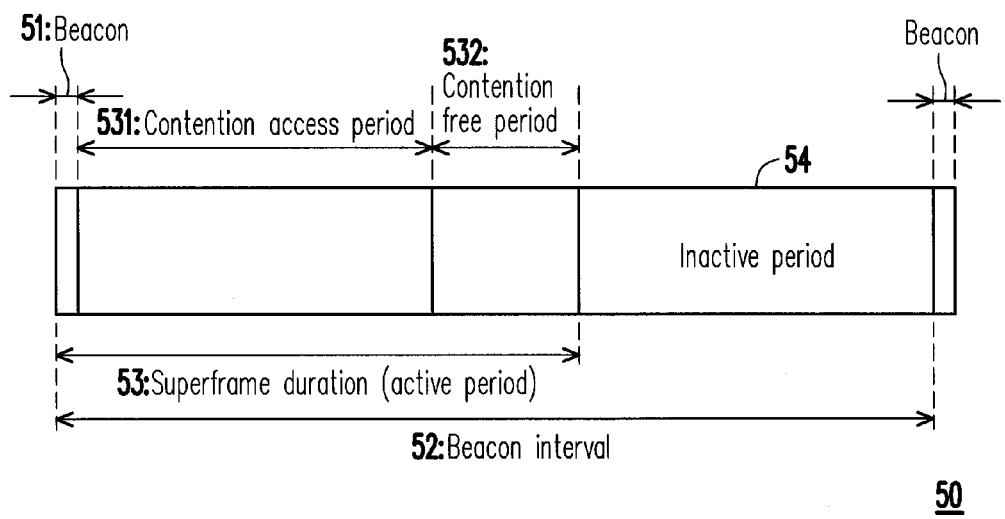
FIG. 5 is a schematic diagram illustrating a broadcast beacon superframe in a beacon mode.

FIG. 5 is a schematic diagram illustrating a broadcast beacon superframe in a beacon mode. The beacon mode may be referred to the Zigbee communication protocol specification or IEEE 802.15.4 specification. Referring to FIG. 5, a M2M gateway serving as a coordinator periodically broadcast a broadcast beacon 51 and a superframe 50 that are transmitted subsequently as shown in FIG. 5. The M2M device may obtain transmission signal related information such as time schedule of the superframe 50 by reading the content of the broadcast beacon 51. The duration length of the superframe 50 is a beacon interval (BI) 52, and more specifically, the number of symbols of the BI 52 is shown in the following equation (1):

$$BI = aBaseSuperframeDuration * 2^{BO} \qquad \text{equation (1)},$$

where, in the equation (1), BI is the number of symbols of the BI 52 (which represents the duration length of the BI 52 indirectly), and aBaseSuperframeDuration is a base superframe duration, which can be referred to IEEE 802.15.4 specification. A beacon order (BO) is a BI adjustment parameter, which is capable of increasing or reducing the duration length of the BI 52 exponentially. The BI 52 includes an active superframe duration (SD) (or referred to as an active period) 53 and an inactive period 54, where the number of symbols of the SD 53 is shown in the following equation (2):

$$SD = aBaseSuperframeDuration * 2^{SO} \qquad \text{equation (2)},$$

where, in the equation (2), SD is the number of symbols of the SD 53 (which represents the duration length of the SD 53), and aBaseSuperframeDuration is a base superframe duration, which can be referred to IEEE 802.15.4 specification. A superframe order (SO) is an SD adjustment parameter, which is capable of increasing or reducing the duration length of the SD 53 exponentially. The SD 53 includes a contention access period (CAP) 531 and a contention free period (CFP) 532.

The M2M device can transmit the uplink data or signal, or receive the downlink data or signal after undergoing a contention procedure with other M2M devices in the CAP 531. However, in the CFP 532, according to a scheduling result of the M2M gateway, the M2M device transmits the uplink data or receives the downlink data or signal in a time slot during this period. Therefore, in the beacon mode, during the allowed period of the LTE network, the method of operating the M2M communication device in the heterogeneous networks increase the ratio of the SD 53 in the BI 52, or decrease the duration length of the inactive period 54 while increasing the duration length of the SD 53, which could improve the throughput in principle. In contrast, during the forbidden period of the LTE network, the LTE network does not process the transmission of the M2M gateway, so the method of operating the M2M communication device in the heterogeneous networks decreases the ratio of the SD 53 in the BI 52, or increases the duration length of the inactive period 54 while reducing the duration length of the SD 53. The method of operating the M2M communication device in the heterogeneous networks are further illustrated in accordance with FIG. 6A and the FIG. 6B.

Figure 6A:
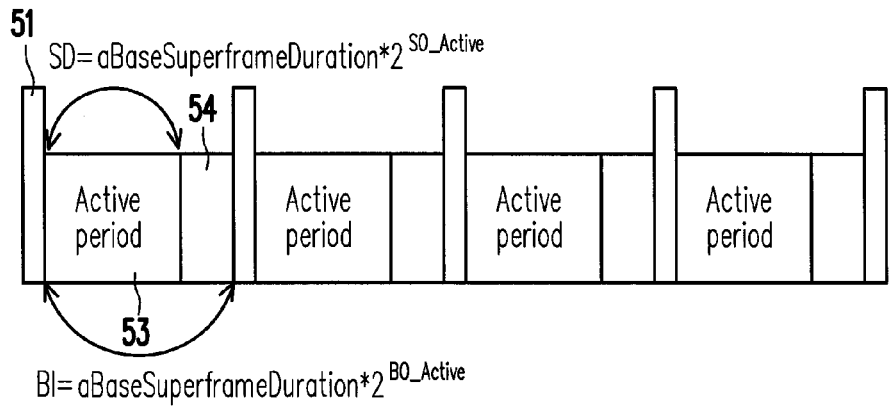
FIG. 6A is a schematic diagram illustrating adjusting a superframe duration in response to an active state in a beacon mode according to an exemplary embodiment of the disclosure.

FIG. 6A is a schematic diagram illustrating adjusting an SD in response to an active state in a beacon mode according to an embodiment of the disclosure. Referring to FIG. 6A, in order to align the SD of the Zigbee network and the allowed period of the LTE network, in the active state of the Zigbee network (the active state will be further illustrated in FIG. 7B), the method of operating the M2M communication device in the heterogeneous networks may relatively decrease the duration length of the BI 52 and relatively increase the duration length of the SD 53, or increase the ratio of the SD 53 in the BI 52. For example, the M2M gateway may broadcast two configuration parameters to the M2M device, for example, a first configuration parameter SO Active and a second configuration parameter BO Active are configuration parameters of the SD 53 and the BI 52 respectively in the active state; and an SD adjustment parameter SO is adjusted to the value of the first configuration parameter SO_Active and a BI adjustment parameter BO is adjusted to the value of the second configuration parameter BO_Active, so that the SD 53 occupies the most part or all portions in the BI 52. In addition, it is possible to decrease the duration length of the BI 52, or increase the duration length of the SD 53, so as to relatively increase the ratio of the SD 53 in the BI 52.

Figure 6B:
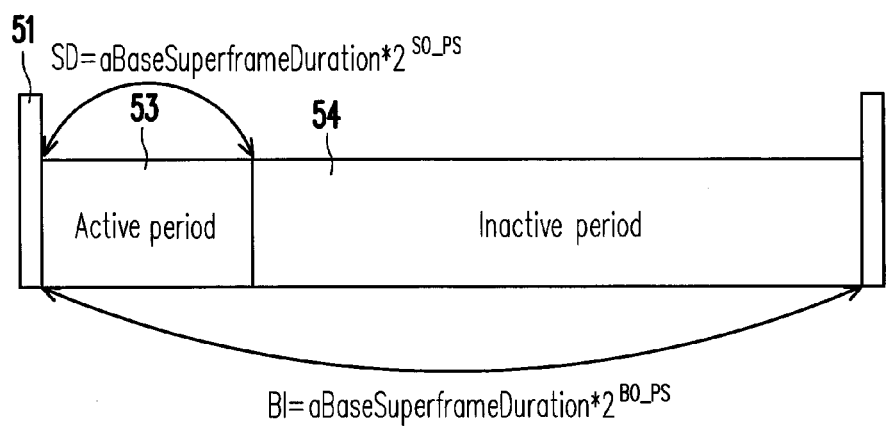
FIG. 6B is a schematic diagram illustrating adjusting a superframe duration in response to a power saving state in a beacon mode according to an exemplary embodiment of the disclosure.

FIG. 6B is a schematic diagram illustrating adjusting an SD in response to a PS state in a beacon mode according to an embodiment of the disclosure. Referring to FIG. 6A, in order to decrease the transmission power consumption in the forbidden period of the LTE network, in the PS state of the Zigbee network (the PS state will be further illustrated in FIG. 7B), the method of operating the M2M communication device in the heterogeneous networks may relatively increase the duration length of the BI 52 and relatively decrease the duration length of the SD 53, or decrease the ratio of the SD 53 in the BI 52. For example, the M2M gateway may broadcast two configuration parameters to the M2M device, for example, a third configuration parameter SO_PS and a fourth configuration parameter BO_PS are adjustment parameters of the SD 53 and the BI 52 respectively in the PS state; and the SD adjustment parameter SO is adjusted to the value of the third configuration parameter SO_PS and the BI adjustment parameter BO is adjusted to the value of the fourth configuration parameter BO_PS, so that the SD 53 occupies a small part or zero portion in the BI 52. In addition, it is possible to increase the duration length of the BI 52, or decrease the duration length of the SD 53, so as to relatively decrease the ratio of the SD 53 in the BI 52.

Figure 7A:
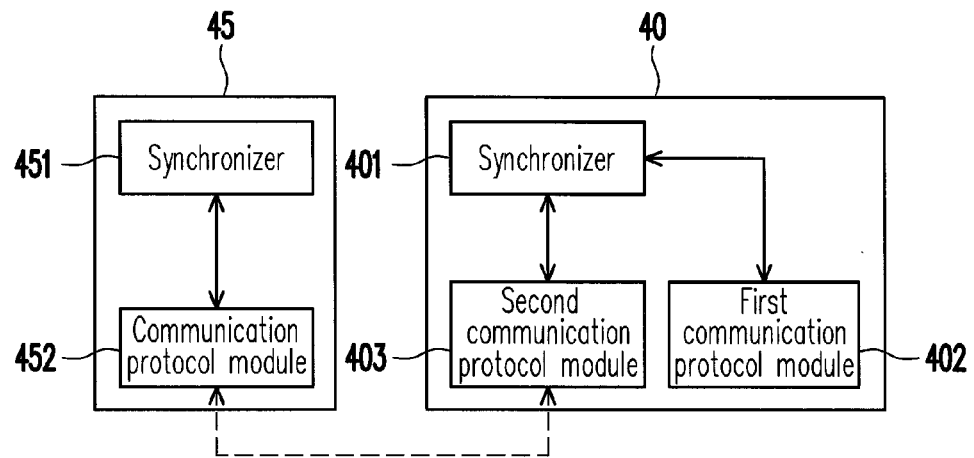
FIG. 7A is a functional block diagram illustrating an M2M communication device and an M2M communication gateway according to an exemplary embodiment of the disclosure.

FIG. 7A is a functional block diagram illustrating an M2M device and an M2M gateway according to an exemplary embodiment of the disclosure. Referring to FIG. 7A, the M2M device 45 includes a synchronizer 451 and a communication protocol module 452; and the M2M gateway 40 includes a synchronizer 401, a second communication protocol module 403 and a first communication protocol module 402. The M2M gateway 40 and the M2M device 45 may further respectively include an antenna (not shown), a memory (not shown), a processor (not shown), and the like for performing the signal transmission and corresponding processing between the communication protocol module 452 of the M2M device 45 and the second communication protocol module 403 of the M2M gateway 40 and for performing the signal transmission and corresponding processing of the first communication protocol module 402 of the M2M gateway 40 in the access network are also implemented.

In the present exemplary embodiment, the communication protocol module 452 of the M2M device 45 and the second communication protocol module 403 of the M2M gateway 40 all support the Zigbee communication protocol, and the first communication protocol module 402 of the M2M gateway 40 supports the LTE communication protocol.

The M2M device 45, through the communication protocol module 452 and the antenna, transmits signal to the second communication protocol module 403 of the M2M gateway 40 and receives signal transmitted by the second communication protocol module 403 of the M2M gateway 40, and vice versa. The communication protocol module 452 may include a processor (not shown) or a digital signal processor (not shown), so as to process the signal transmission or data transmission with the second communication protocol module 403 of the M2M gateway 40, and perform the step of the Zigbee communication protocol. The synchronizer 451 of the M2M device 45 is connected to the communication protocol module 452, and enables the state and power saving cycle of the communication protocol module 452 to be synchronized with the power saving cycle of the LTE network by receiving the signal transmitted by the second communication protocol module 403. Likewise, the synchronizer 451 may include a processor (not shown) or a memory (not shown), the memory of the synchronizer 451 stores program codes of steps that need to be executed by the synchronizer 451, and after the execution of the processor of the synchronizer 451, the state and the power saving cycle of the communication protocol module 452 may become synchronized with the power saving cycle of the LTE network. In addition, the synchronizer 451 includes at least one timer (not shown) for respectively counting a "Time-to-Next-State", a "Active State Time", and a "Power Saving State Time".

The M2M gateway 40, through the second communication protocol module 403 and the antenna, transmits signal to the communication protocol module 452 of the M2M device 45 and receives the signal transmitted by the communication protocol module 452 of the M2M device 45, and vice versa. The M2M gateway 40, through the first communication protocol module 402 and the antenna, transmits the signal to the LTE network, and receives the signal via the LTE network. The second communication protocol module 403 may include a processor (not shown) or a digital signal processor (not shown), so as to process the signal transmission or data transmission with the communication protocol module 452 of the M2M device 45, and execute the step(s) of the Zigbee communication protocol. The synchronizer 401 of the M2M gateway 40 is connected to the second communication protocol module 403 and the first communication protocol module 402, and by processing the signal received by the first communication protocol module 402 via the LTE network, enables the state and the power saving cycle of the second communication protocol module 403 to be synchronized with the power saving cycle of the LTE network. Likewise, the synchronizer 401 may include a processor (not shown) or a memory (not shown), the memory of the synchronizer 401 stores program codes of steps that need to be executed by the synchronizer 401, and after the execution of the processor of the synchronizer 401, the state and the power saving cycle of the second communication protocol module 403 may become synchronized with the power saving cycle of the LTE network. In addition, the synchronizer 401 includes at least one timer for respectively counting a "allowed period expiration time" and a "Next periodic TAU time" in different states.

Figure 7B:
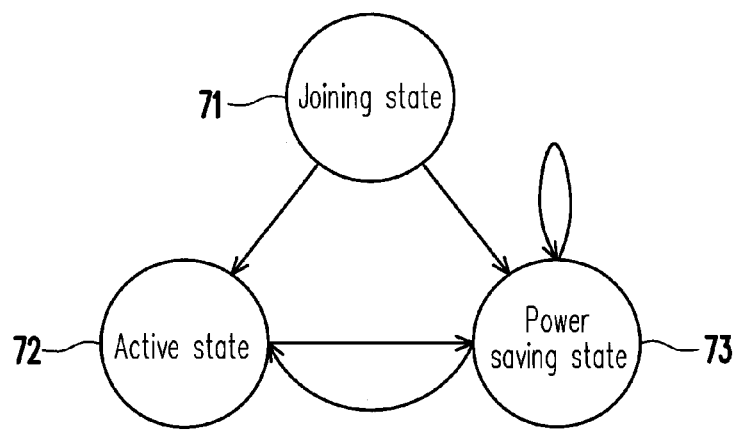
FIG. 7B is a power saving state transition diagram of an M2M communication device and an M2M communication gateway according to an exemplary embodiment of the disclosure.

FIG. 7B is a power saving state transition diagram of an M2M device and an M2M gateway according to an exemplary embodiment of the disclosure. Generally, the M2M device 45 and the M2M gateway 40 need to execute a joining procedure (that is, enter a joining state) to establish signal connection between the M2M device 45 and the M2M gateway 40, so as to enter one of the other two major states (i.e., active state or PS state) shown in FIG. 7B.

Referring to FIG. 7B, three major states include a joining state 71, an active state 72 and a PS state 73. More specifically, in this embodiment, after the M2M device 45 is powered on in the joining state 71, the M2M device 45 may enter the active state 72 or the PS state 73.

When the M2M device 45 and the M2M gateway 40 are in the active state 72, if a power saving cycle of a corresponding LTE network is changed from an allowed period to a forbidden period, the M2M device 45 and the M2M gateway 40 are changed from the "Active state 72" to the "PS state 73".

When the M2M device 45 and the M2M gateway 40 are in the active state 72, the power saving cycle of the corresponding LTE network is changed from the forbidden period to the allowed period, the M2M device 45 and the M2M gateway 40 are changed from the "PS state 73" to the "Active state 72".

In a non-beacon mode, the M2M gateway 405 performs a non-periodic TAU procedure of the LTE network in the "PS state 73", and after the non-periodic TAU procedure, the M2M device 45 and the M2M gateway 40 are changed from the "PS state 73" to the "PS state 73" and have their states changed until a next periodic allowed period. Alternatively, in the beacon mode, the M2M gateway 405 performs the non-periodic TAU procedure of the LTE network to enter the allowed period, and therefore, the M2M device 45 and the M2M gateway 40 are changed from the "PS state 73" to the "active state 72".

FIG. 8 is a flowchart illustrating a transition from a joining state to a PS state/an active state in a non-beacon mode according to a first embodiment of the disclosure. Referring to FIG. 7A, FIG. 7B and FIG. 8, in step 801, the communication protocol module 452 of the M2M device 45 and the second communication protocol module 403 of the M2M gateway 40 perform a joining procedure of the Zigbee communication protocol, and the communication protocol module 452 and the second communication protocol module 403 enter a "joining state". In step 802, the synchronizer 401 generates synchronization data, and the second communication protocol module 403 stores the synchronization data. The synchronization data is then sent to the communication protocol module 452 through the subsequent step 803 to step 805. The synchronization data in the present embodiment includes the following information: a "Time-to-Next-State" parameter, a "current state", a "power saving state polling rate (Rate-PS)", and a "active state polling rate (Rate-Active)".

Step 803 to step 805 are respectively similar to the step 411 to step 413 in FIG. 4B, and detailed technical content is not repeated herein. In step 806, the synchronizer 451 obtains the synchronization data. In step 807, the synchronizer 451 sets a current polling rate as a polling rate of the "current state", and in the present embodiment, the joining state may be changed to the PS state/active state, so the "current state" may be the "active state 72" or "PS state 73". In step 808, the synchronizer 451 sets an expiration time of a first timer as the "Time-to-Next-State". If the "current state" is the PS state, the "Time-to-Next-State" is actually the "PS state time"; and in contrast, when the "current state" is the active state, the "Time-to-Next-State" is actually the "active state time".

Figure 12:
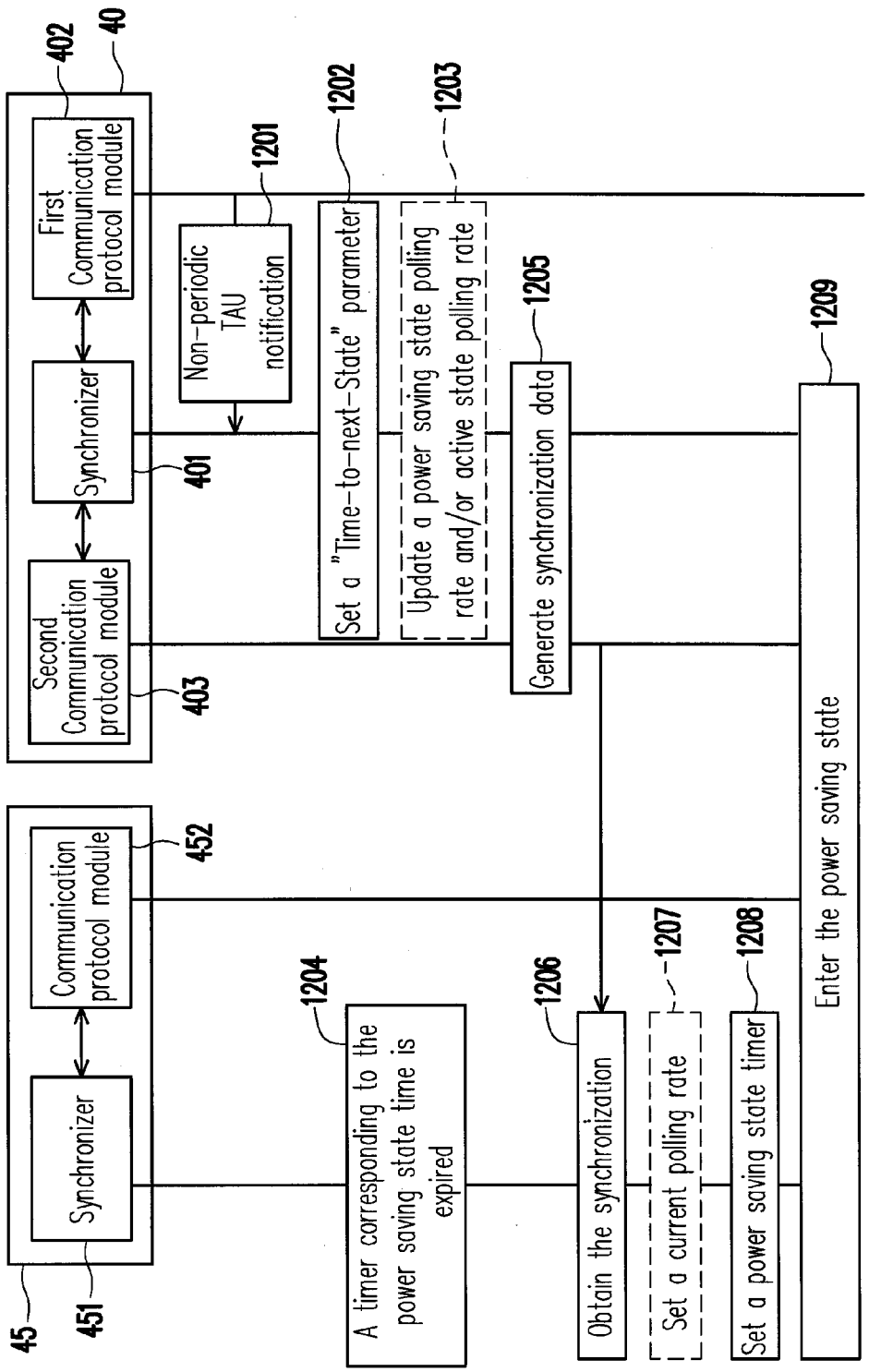
FIG. 12 is a flowchart illustrating transition from a PS state to a PS state in a non-beacon mode according to the first exemplary embodiment of the disclosure.

Further, when the M2M device 45 operates in the non-beacon mode and joins the Zigbee network for the first time to be connected to the M2M gateway 40, the synchronizer 451 of the M2M device 45 receives first synchronization data from the gateway 40 via the communication protocol module 452, where, the first synchronization data is the synchronization data as described in the text illustrating FIG. 8. In addition, when the synchronizer 451 receives second synchronization data from the gateway 40 via the communication protocol module 452, the synchronizer 451 performs a transition (from a PS state to an active state, from an active state to a PS state or from a PS state to a PS state). Procedures of the transitions are illustrated in FIG. 9, FIG. 10, and FIG. 12 and described as follows.

Figure 9:
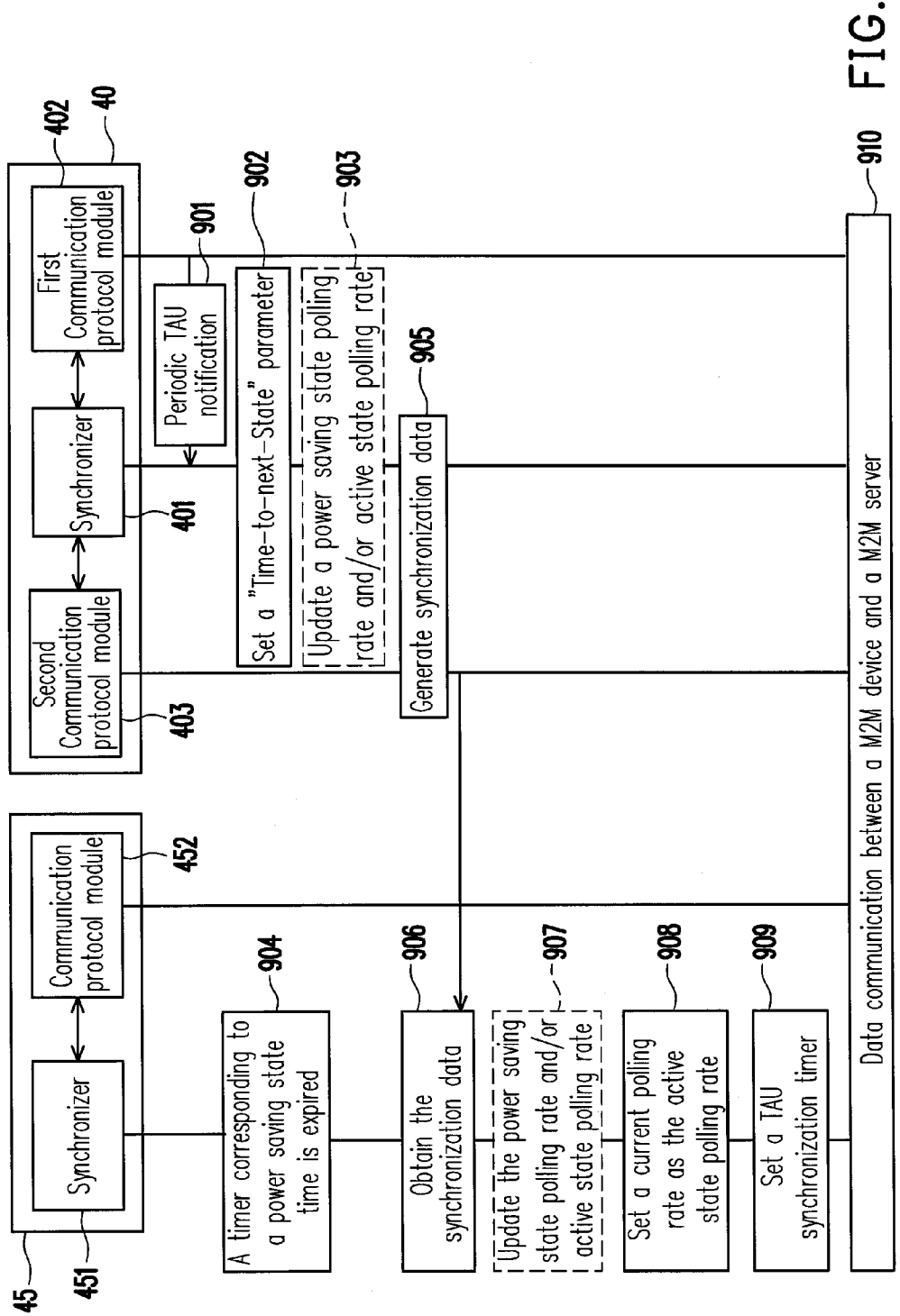
FIG. 9 is a flowchart illustrating transiting from a PS state to an active state in a non-beacon mode according to a first exemplary embodiment of the disclosure.
Figure 10:
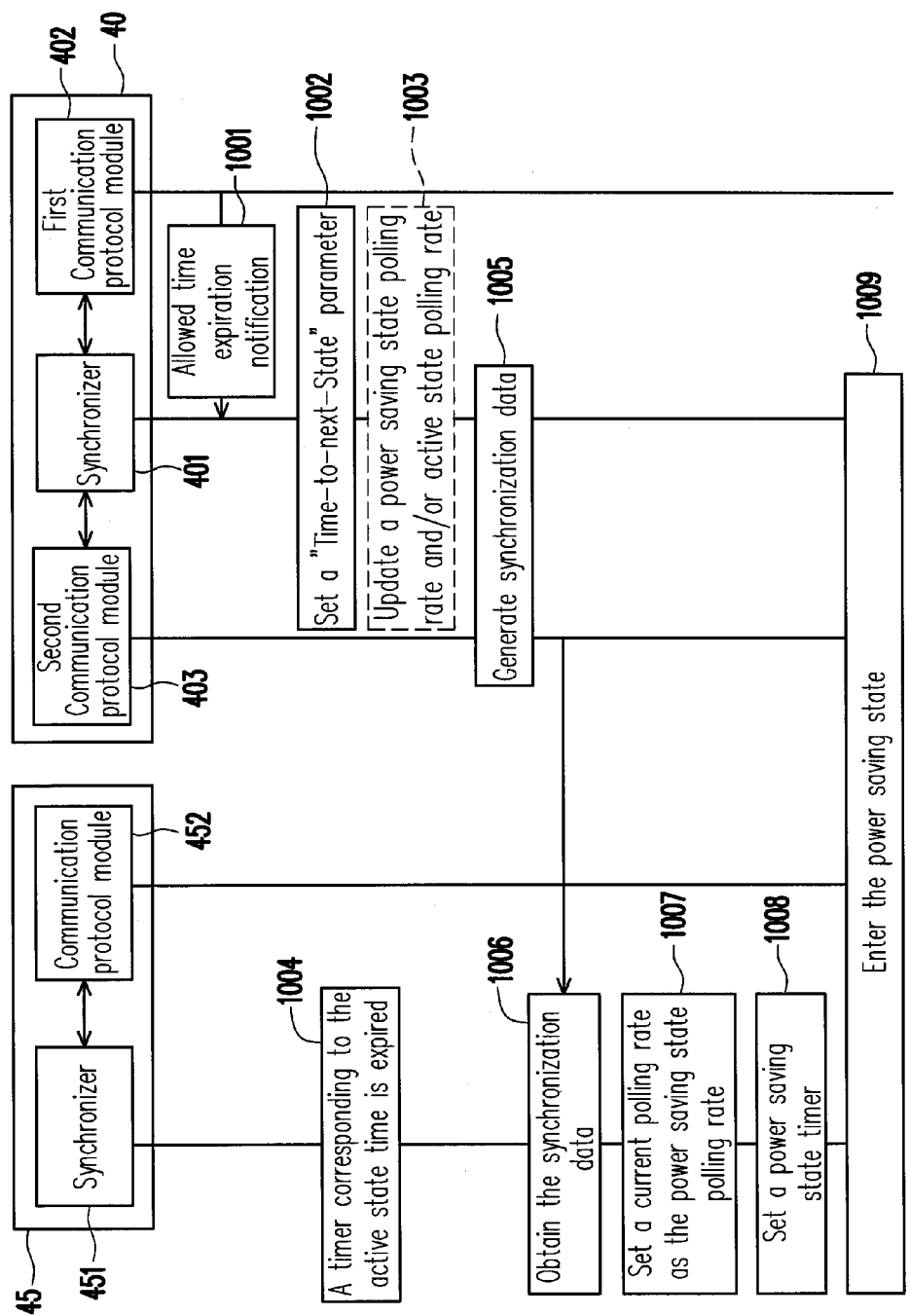
FIG. 10 is a schematic flow chart illustrating transition from an active state to a PS state in a non-beacon mode according to a first exemplary embodiment of the disclosure.

FIG. 9 is a flowchart illustrating a transition from a PS state to an active state in a non-beacon mode according to the first embodiment of the disclosure. Referring to FIG. 7A, FIG. 7B, and FIG. 9, in step 901, after executing a periodic TAU, the first communication protocol module 402 of the M2M gateway 40 transmits a periodic TAU notification to the synchronizer 401. In step 902, the synchronizer 401 sets a Time-to-Next-State parameter as a "allowed period expiration time". In step 903, the synchronizer 401 updates a power saving state polling rate and/or an active state polling rate. In step 904, the first timer of the synchronizer 451 which is configured for counting the "power saving state time" is expired.

In step 905, the synchronizer 401 generates synchronization data, and the second communication protocol module 403 stores the synchronization data. The second communication protocol module 403 then transmits the synchronization data to the communication protocol module 452 in steps similar to the step 803 to the step 805 illustrated in FIG. 8. The implementation of transmitting the synchronization data is omitted herein, and may be referred to FIG. 8. The synchronization data in the present embodiment includes the following information: a "Time-to-Next-State" parameter, a "isTimeUpdateOnly" flag (which may refer to a Time-Update-Only flag), a "power saving state polling rate", and a "active state polling rate". In the present embodiment, the "isTimeUpdateOnly" flag is set as "False".

In step 906, the synchronizer 451 obtains the synchronization data. In step 907, the synchronizer 451 updates the power saving state polling rate and/or active state polling rate. In step 908, the synchronizer 451 sets the current polling rate as the polling rate of the "active state 72", that is, the "active state polling rate". In step 909, the synchronizer 451 sets the expiration time of the first timer as the "Time-to-Next-State", and at this time, the "Time-to-Next-State" is actually the "Active State Time". In step 910, the M2M device 45 performs data communication with the M2M server via the communication protocol module 452, the second communication protocol module 403, and the first communication protocol module 402.

FIG. 10 is a flowchart illustrating transiting from an active state to a PS state in a non-beacon mode according to the first embodiment of the disclosure. Referring to FIG. 7A, FIG. 7B, and FIG. 10, in step 1001, the first communication protocol module 402 of the M2M gateway 40 transmits an allowed period expire notification to the synchronizer 401. In step 1002, the synchronizer 401 sets the Time-to-Next-State parameter as "Next Periodic TAU Time". In step 1003, the synchronizer 401 updates the power saving period polling rate and/or the active period polling rate. In step 1004, the first timer of the synchronizer 451, which is configured for counting the "Active State Time" is expired.

In step 1005, the synchronizer 401 generates synchronization data, and the second communication protocol module 403 stores the synchronization data. The second communication protocol module 403 then transmits the synchronization data to the communication protocol module 452 through steps similar to the step 803 to the step 805 illustrated in FIG. 8. The implementation of transmitting the synchronization data is omitted herein, and may be referred to FIG. 8. The synchronization data in the present embodiment includes the following information: a "Time-to-Next-State" parameter, a "isTimeUpdateOnly" flag (which refers to a Time-Update-Only flag), "power saving state polling rate", and "active state polling rate". In the present embodiment, the "isTimeUpdateOnly" flag is set as "False".

In step 1006, the synchronizer 451 obtains the synchronization data. In step 1007, the synchronizer 451 sets the current polling rate as the polling rate of the "PS state 73", that is, the "power saving state polling rate". In step 1008, the synchronizer 451 sets the expiration time of the first timer as the "Time-to-Next-State", and at this time, the "Time-to-Next-State" is actually the "Power Saving State Time". In step 1009, the communication protocol module 452 of the M2M device 45 and the second communication protocol module 403 of the M2M gateway 40 enter the "PS state 73".

Figure 11A:
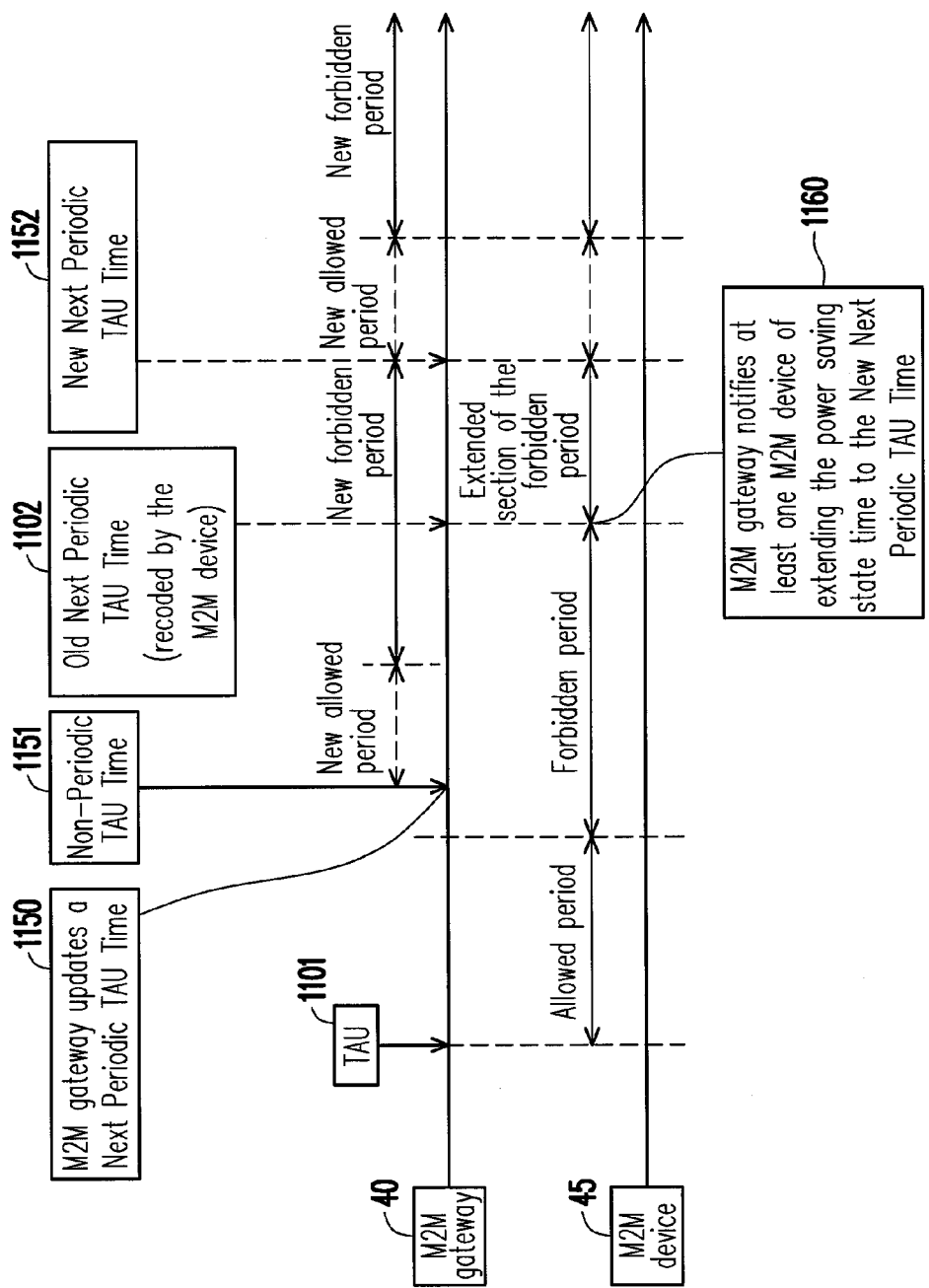
FIG. 11A is a schematic diagram illustrating power saving cycle change in adaptation to access network in a non-beacon mode according to the first exemplary embodiment of the disclosure.

FIG. 11A is a schematic diagram illustrating power saving cycle change in adaptation to access network in a non-beacon mode according to the first embodiment of the disclosure. Referring to FIG. 7A and FIG. 11A, after a periodic TAU time 1101, the first communication protocol module 402 of the M2M gateway 40 performs the non-periodic TAU procedure at the non-Periodic TAU Time 1151 in the "Forbidden Period" since one of conditions of the non-periodic TAU is true, so that after the update procedure, the M2M gateway 40 updates a Next Periodic TAU Time 1152 as a new Next Periodic TAU Time which is inconsistent with the next periodic TAU 1102 time known by the M2M device 45 currently. In the old Next Periodic TAU Time 1102, the M2M device 45 records the TAU time, so the M2M device 45 may originally wake up at this time point. The synchronizer 401 receives a non-periodic TAU notification, so the synchronizer 401 determines that the M2M device 45 should extend the current "PS state 73" until the new Next Periodic TAU Time. Therefore, the M2M gateway 40 will notify at least one M2M device to execute the process of changing from the PS state to the PS state in the Old Next Periodic TAU Time 1102, that is, in the step 1160, so as to extend the time of the current "PS state 73" of the M2M device 45 until the new Next Periodic TAU Time 1152. For example, after receiving the TAU 1101, the non-periodic TAU 1151 is performed in the "Forbidden Period", the synchronizer 401 of the M2M gateway 40 updates the Next Periodic TAU Time in step 1150 (corresponding to the non-periodic TAU time 1151), and the synchronizer 401 of the M2M gateway 40 determines that the M2M device 45 should extend the current "PS state 73" until the new Next Periodic TAU Time 1152.

The non-periodic TAU is reached in the forbidden period after the periodic TAU time 1101, that is, it is reached at the non-periodic TAU time 1151, so the new periodic TAU time is shifted to the new Next Periodic TAU Time 1152, and the Old Periodic TAU Time 1102 is no longer used. In FIG. 11A, "new allowed period" is shifted to be after the non-periodic TAU time 1151 and the new Next Periodic TAU Time 1152, and followed by a "new Forbidden Period".

Figure 11B:
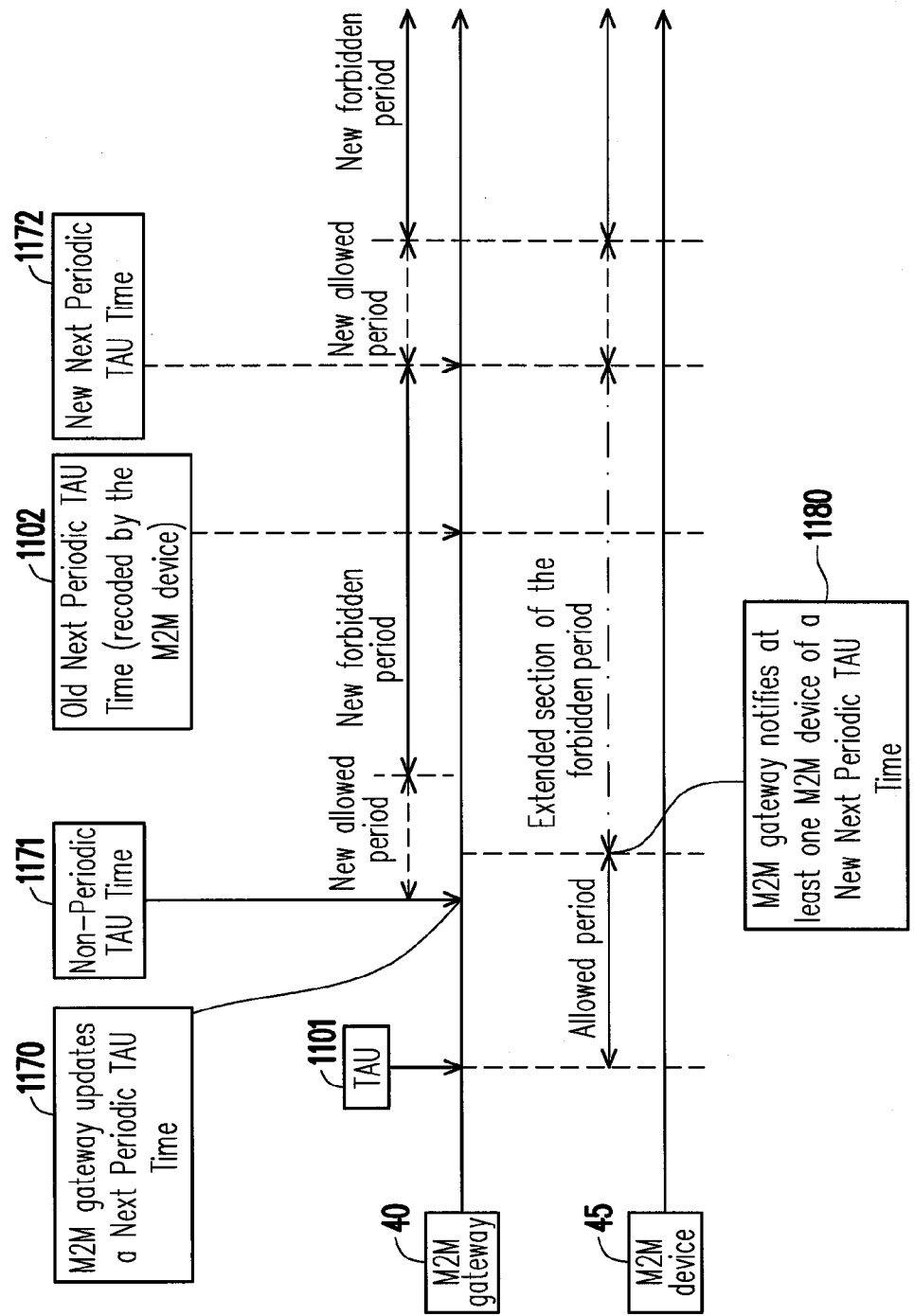
FIG. 11B is a schematic diagram illustrating another power saving cycle change in adaptation to access network in a non-beacon mode according to the first exemplary embodiment of the disclosure.

FIG. 11B is a schematic diagram illustrating another power saving cycle change in adaptation to access network in a non-beacon mode according to the first embodiment of the disclosure. Referring to FIG. 7A and FIG. 11B, when the first communication protocol module 402 of the M2M gateway 40 performs the non-periodic TAU procedure at the non-periodic TAU time 1171 in the "Allowed Period", the non-periodic TAU procedure results in the new Next Periodic TAU Time, which is inconsistent with the Next Periodic TAU Time 1102 known by the M2M device 45 currently, the synchronizer 401 of the M2M gateway 40 updates a Next Periodic TAU Time in step 1170 (corresponding to the non-periodic TAU time 1171), and executes no other actions. When the synchronizer 401 determines that the M2M device 45 performs the process of changing from the active state to the PS state (that is, when the old allowed period is ended), in step 1180, the synchronizer 401 of the M2M gateway 40 notifies the M2M device 45 of a new Next Periodic TAU Time, and accordingly has an extended forbidden period after the old allowed period is ended.

In the old Next Periodic TAU Time 1102, the M2M device 45 records the TAU time, and the M2M device 45 originally should wake up at this time point. However, in the step 1180, the Next Periodic TAU Time is updated to the new Next Periodic TAU Time after the old Next Periodic TAU Time 1102, so the M2M device 45 still keeps in the "PS state 73" after the Old Periodic TAU Time 1102 until the New Next Periodic TAU Time 1172. There is no state change in the present embodiment. In this way, the M2M gateway 40 enables the power saving mode of the M2M device 45 to be aligned with the changing situation of the access network power saving cycle resulted by the arrival of the non-periodic TAU time 1171. In FIG. 11B, the "new Allowed Period" is adjusted to the non-periodic TAU time 1171, and the new Next Periodic TAU Time 1172 is followed by a "new Forbidden Period".

FIG. 12 is a flowchart illustrating a transition from a PS state to a PS state in a non-beacon mode according to the first embodiment of the disclosure, so as to extend the PS state until the New Next Periodic TAU Time. Referring to FIG. 7A, FIG. 7B, and FIG. 12, in step 1201, after executing a non-periodic TAU, the first communication protocol module 402 of the M2M gateway 40 transmits a non-periodic TAU notification to the synchronizer 401. In step 1202, the synchronizer 401 sets the Time-to-Next-State parameter as a new "Next Periodic TAU Time".

In step 1203, the synchronizer 401 updates a power saving period polling rate and/or an active period polling rate. In step 1204, the first timer of the synchronizer 451, which is configured for counting the "Power Saving State Time" is expired, which drives the action of synchronization data.

In step 1205, the synchronization data is generated, and is stored by the second communication protocol module 403. Then, the second communication protocol module 403 transmits the synchronization data to the communication protocol module 452 through the steps similar to the step 803 to the step 805 illustrated in FIG. 8. The implementation of transmitting the synchronization data may be omitted herein, and may be referred to FIG. 8. The synchronization data in this embodiment includes the following information: a "Time-to-Next-State" parameter, a "isTimeUpdateOnly" flag (which may refer to a Time-Update-Only flag), "power saving state polling rate", and "active state polling rate". In the present embodiment, the "isTimeUpdateOnly" flag is set as "True". In step 1206, the synchronizer 451 obtains the synchronization data. In step 1207, the synchronizer 451 sets the current polling rate as the polling rate of the "PS state 73", that is, the "power saving state polling rate". The step 1207 is optional. In step 1208, the synchronizer 451 sets the expiration time of the first timer as the "Time-to-Next-State", and at this time, the "Time-to-Next-State" is still the "Power Saving State Time". In step 1209, the communication protocol module 452 of the M2M device 45 and the second communication protocol module 403 of the M2M gateway 40 enter the "PS state 73".

Figure 13:
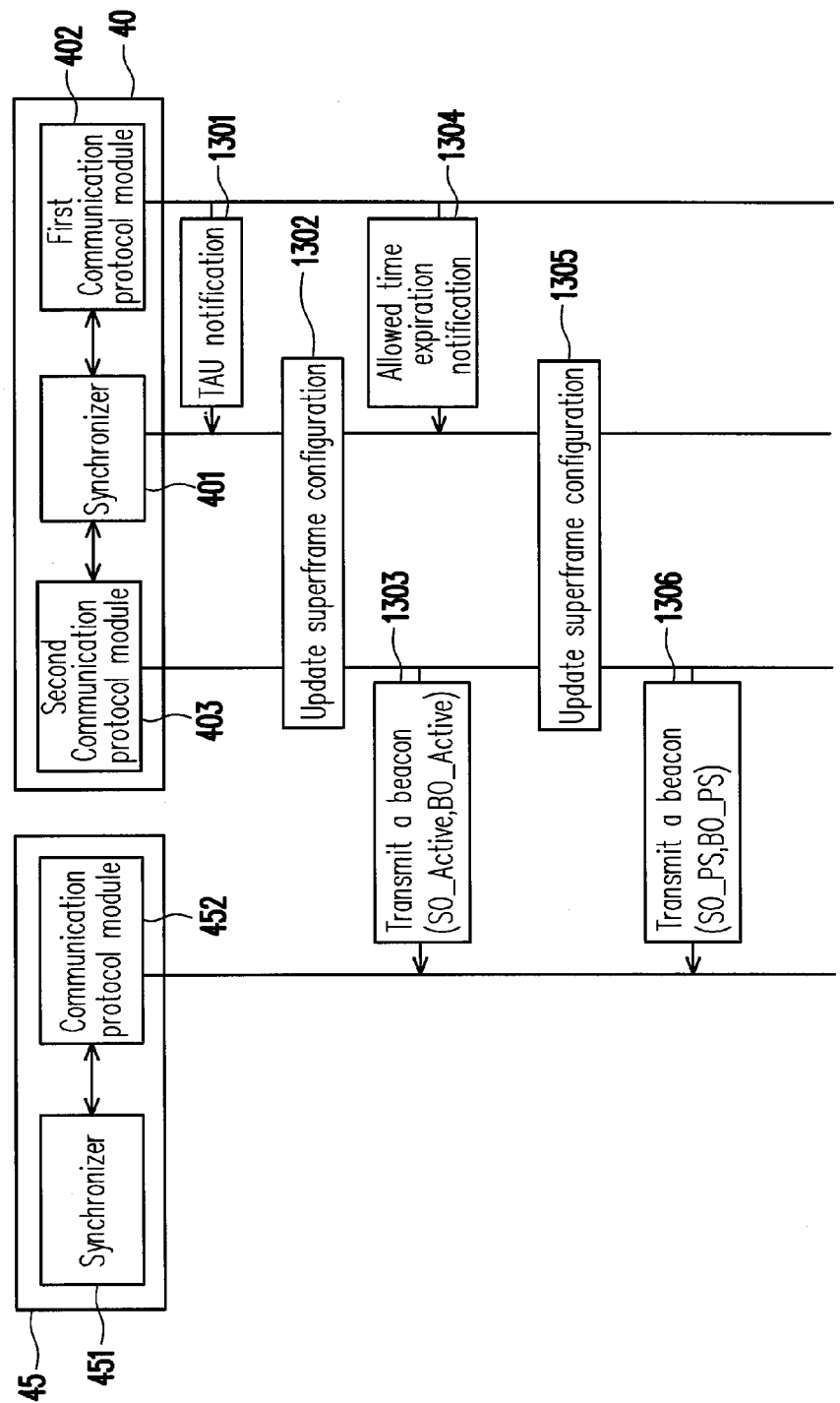
FIG. 13 is a flowchart illustrating changing superframe configuration in a beacon mode in response to an access network power saving cycle according to a second exemplary embodiment of the disclosure.

FIG. 13 is a flowchart illustrating changing superframe configuration in a beacon mode in response to an access network power saving cycle according to a second embodiment of the disclosure, where FIG. 13 includes a flowchart of a transition from the PS state to the active state and a flowchart of a transition from the active state to the PS state. Referring to FIG. 7A, FIG. 7B, and FIG. 13, in step 1301, after executing a TAU, the first communication protocol module 402 of the M2M gateway 40 transmits a TAU notification to the synchronizer 401, where the TAU may be a periodic TAU or a non-periodic TAU. In step 1302, the synchronizer 401 notifies the second communication protocol module 403 of updating superframe configuration. In step 1303, the second communication protocol module 403 transmits a first beacon carrying a first configuration parameter SO_Active and a second configuration parameter BO_Active to the communication protocol module 452. Thereafter, the communication protocol module 452 of the M2M device 45 adopts the new beacon parameters and the superframe configuration.

In step 1304, the synchronizer 401 of the M2M gateway 40 notifies the second communication protocol module 403 that the "Allowed Period" is expired. In step 1302, the synchronizer 401 and the second communication protocol module 403 update the superframe configuration. In step 1303, the second communication protocol module 403 transmits a second beacon carrying a third configuration parameter SO_PS and a fourth configuration parameter BO_PS to the communication protocol module 452. Thereafter, the communication protocol module 452 of the M2M device 45 adopts the new beacon parameters and the superframe configuration. It is noted that, in the beacon mode, the M2M device 45 passively receives a beacon controlled signal for updating the superframe configuration, without the need of any change in the communication protocol procedure.

Figure 14:
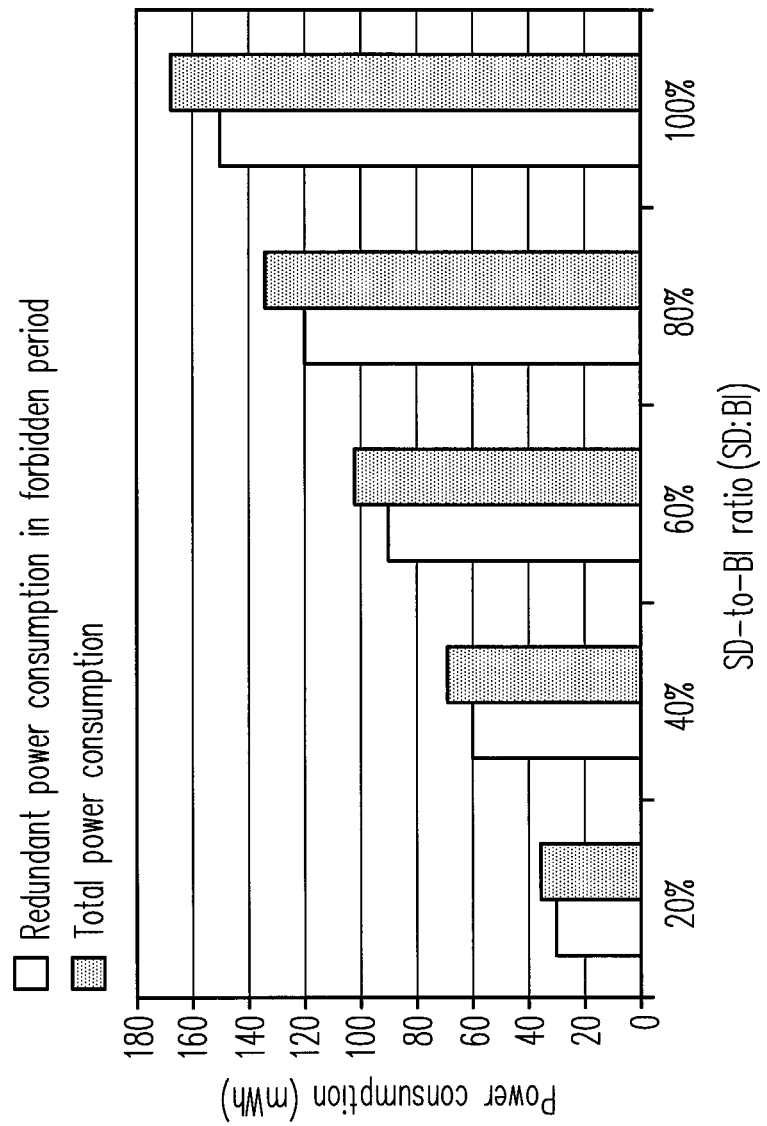
FIG. 14 is a schematic diagram illustrating simulation of power consumption change of an M2M communication gateway in a beacon mode.

FIG. 14 is a schematic diagram illustrating a simulation of power consumption change of an M2M gateway in a beacon mode. In FIG. 14, a horizontal axis indicates an SD-to-BI ratio, and a vertical axis indicates the power consumption (millwatts per hour, mwh), FIG. 14 shows simulated change situation of "redundant power consumption in Forbidden Period" and "total power consumption" changed along with the SD-to-BI ratio. In the simulation of FIG. 14, it is assumed that in the SD, the power consumption of the M2M gateway in the "active state" is A mwh, and in duration of the BI except for the duration of the SD, the power consumption of the M2M gateway in the "PS state" is B mwh. For example, when the "SD-to-BI ratio" is 20%, the "total power consumption" is 20%*A mwh+80%*B mwh. The "redundant power consumption in the Forbidden Period" is unnecessary power consumption.

It can be seen from FIG. 14 that, in the situation that the SD-to-BI ratio cannot be adjusted, when the "SD-to-BI ratio" is 20%, the "redundant power consumption in the Forbidden Period" is relatively low, and when the "SD-to-BI ratio" gradually increases, the "redundant power consumption in the Forbidden Period" is increased gradually. Therefore, the method of operating the M2M communication device in heterogeneous networks may include, when the LTE network is in the "allowed period", adjusting the "SD-to-BI ratio" to a higher ratio, for example, 100%; and when the in LTE network is in the "forbidden period", adjusting the "SD-to-BI ratio" to a lower ratio, for example, 20%, thereby reducing unnecessary power consumption.

Figure 15:
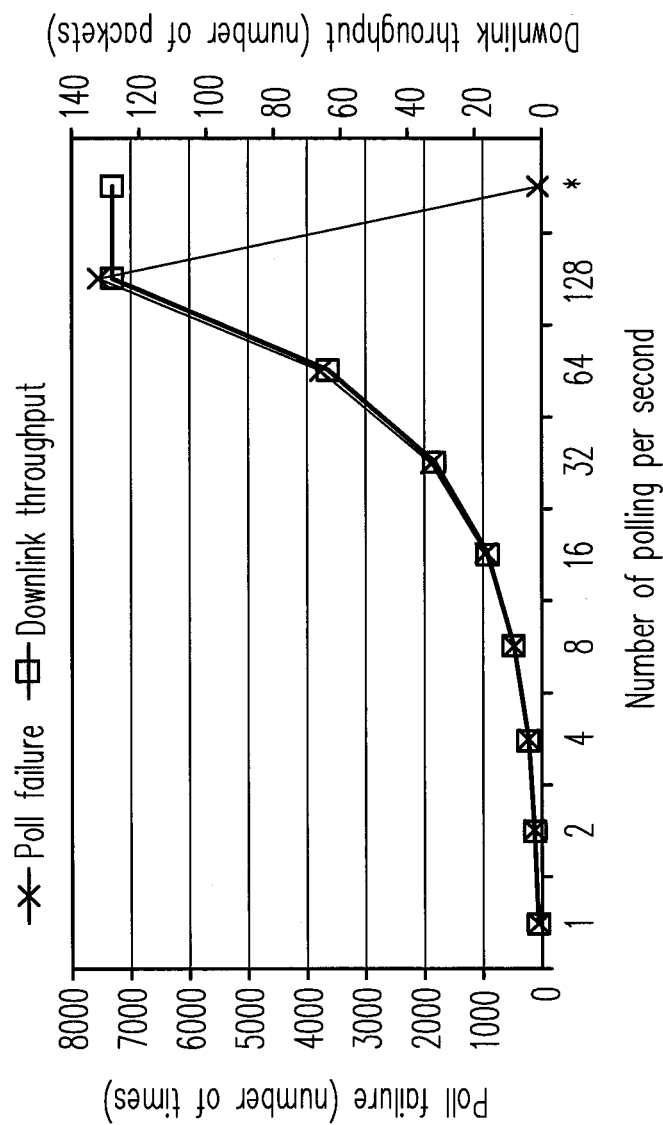
FIG. 15 is a schematic diagram illustrating simulation of downlink throughput and poll failure of an M2M communication gateway changed along with the polling rate in a non-beacon mode.

FIG. 15 is a schematic diagram illustrating simulation of downlink throughput and poll failure of an M2M gateway changed along with the polling rate in a non-beacon mode. In FIG. 15, a vertical axis on the left side indicates the poll failure (number of times), a vertical axis on the right side indicates downlink throughput (number of packets), and a horizontal axis indicates the polling rate (number of polling per second).

FIG. 15 shows simulated change situation of the poll failure and the downlink throughput in different polling rates in the situation that the polling rate cannot be adjusted. In the simulation of FIG. 15, it is assumed that the TAU period is 60 seconds, and the "allowed period" of the LTE network is 1 minute. It can be seen from FIG. 15 that, in the situation that the polling rate cannot be adjusted, the downlink throughput is increased, but the poll failure is also increased (that is, in the "forbidden period", the M2M device still attempts to transmit a polling to the M2M gateway, thereby generating the failure of transmitting to the M2M server). In comparison, * at the lower right corner of the FIG. 15 indicates that it can be adjusted to the maximum polling rate in the "allowed period", and adjusted to the minimum polling rate in the "forbidden period", thereby achieving the simulation result of maximizing the downlink throughput and minimizing the poll failure.

Figure 16:
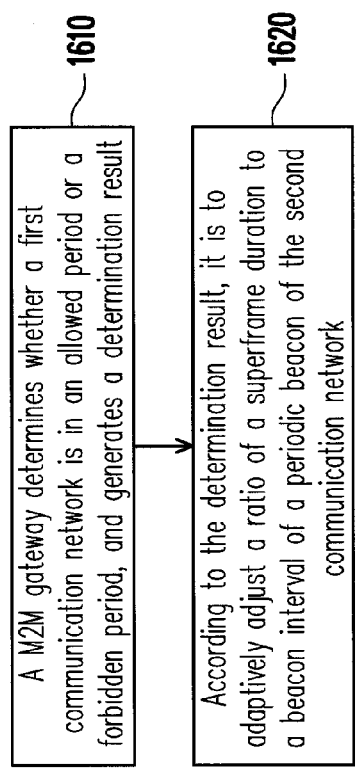
FIG. 16 is a flowchart illustrating a method for operating an M2M communication device in heterogeneous networks according to an exemplary embodiment of the disclosure.

FIG. 16 is a flowchart illustrating a method of operating an M2M communication device in heterogeneous networks according to an embodiment of the disclosure. Referring to FIG. 7A and FIG. 16, the method of operating M2M communication device the in heterogeneous networks is applicable to an M2M gateway 40 connecting a first communication network (for example, the access network 13 illustrated in FIG. 1) and a second communication network (for example, the wireless communication network 15 illustrated in FIG. 1), and includes the followings: when the M2M gateway 40 operates in a beacon mode of the second communication network, the M2M gateway 40 determining whether the first communication network is in an allowed period or a forbidden period, and generating a determination result (step 1610); according to the determination result, the M2M gateway 40 adaptively adjusting a ratio of an SD to a BI of a periodic beacon of the second communication network (step 1620), where the M2M gateway 40 is connected to an M2M communication server via the first communication network, and the gateway is connected to at least one M2M communication device via the second communication network. The steps 1610-1620 may be operated repeatedly. In addition, the method of operating the M2M communication device in heterogeneous networks may further include specific technical approaches of the first embodiment in FIG. 4A, FIG. 4B, FIG. 8 to FIG. 12, which are not repeated herein.

Figure 17:
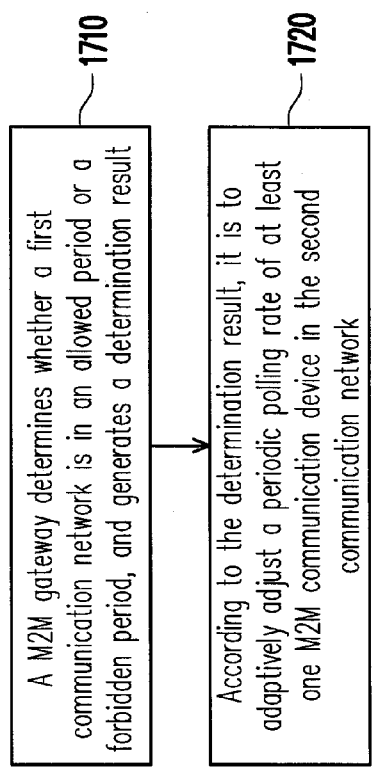
FIG. 17 is a flowchart illustrating another method for operating an M2M communication device in heterogeneous networks according to an exemplary embodiment of the disclosure.

FIG. 17 is a flowchart illustrating another method of operating an M2M communication device in heterogeneous networks according to an embodiment of the disclosure. Referring to FIG. 7A and FIG. 17, the method of operating the M2M communication device in heterogeneous networks is applicable to an M2M gateway 40 connecting a first communication network (for example, the access network 13 illustrated in FIG. 1) and a second communication network (for example, the wireless communication network 15 illustrated in FIG. 1), and includes the followings: when the M2M gateway 40 operates in a non-beacon mode of the second communication network, the M2M gateway 40 determining whether the first communication network is in an allowed period or a forbidden period, and generating a determination result (step 1710); according to the determination result, the M2M gateway 40 adaptively adjusting a periodic polling rate of at least one M2M communication device in the second communication network (step 1720), where the M2M gateway 40 is connected to an M2M communication server via the first communication network, and the gateway is connected to the at least one M2M communication device via the second communication network. The step 1710-1720 may be operated repeatedly. In addition, the method of operating the M2M communication device in heterogeneous networks may further include specific technical approaches of the first embodiment in FIG. 5, FIG. 6A, FIG. 6B and FIG. 13, which are not repeated herein.

In view of the above, according to exemplary embodiments of the disclosure, operation methods of M2M communication device in heterogeneous networks and a gateway and a wireless communication device using the same are provided. By determining whether the first communication network connected to the gateway is in an allowed period or a forbidden period, it is to adaptively adjust a ratio of an SD to a BI of a periodic beacon of the second communication network, or adaptively adjust a periodic polling rate of at least one M2M communication device in the second communication network. In principle, the power saving cycle of the second communication network may be matched with the power saving cycle of the first communication network, or the poll failure might be decreased, thereby might improve overall throughput and reducing overall system power consumption.

It will be apparent to those skilled in the art that various modifications and variations can be made to the structure of the disclosed embodiments without departing from the scope or spirit of the disclosure. In diagram of the foregoing, it is intended that the disclosure cover modifications and variations of this disclosure provided they fall within the scope of the following claims and their equivalents.

What is claimed is:

1. An operation method in heterogeneous networks, applicable to a gateway connecting a first communication network and a second communication network, comprising:
   when the gateway operates in a beacon mode of the second communication network, the gateway determining whether the first communication network is in an allowed period or a forbidden period, and generating a determination result; and
   the gateway, according to the determination result, adaptively adjusting a ratio of a superframe duration (SD) to a beacon interval (BI) of a periodic beacon of the second communication network,
   wherein, the gateway is connected to a machine-to-machine (M2M) communication server via the first communication network, and the gateway is connected to at least one M2M communication device via the second communication network,
   wherein the step of adaptively adjusting the ratio of the SD to the BI of the second communication network according to whether the first communication network is in the allowed period or the forbidden period comprises:
   when the first communication network is in the allowed period, the gateway increases the ratio of the SD to the BI of the periodic beacon of the second communication network, wherein the BI is greater than the SD; and
   when the first communication network is in the forbidden period, the gateway decreases the ratio of the SD to the BI of the periodic beacon of the second communication network.

2. The operation method in heterogeneous networks of claim 1, further comprising:

when the gateway is originally in a power saving (PS) state and executes a tracking area update (TAU) procedure of the first communication network, switching the gateway and the at least one M2M communication device of the second communication network from the PS state to an active state; and when the gateway is originally in the active state and an allowed period is expired, switching the gateway and the at least one M2M communication device of the second communication network from the active state to the PS state.

3. The operation method in heterogeneous networks of claim 2, further comprising:

when the first communication network is changed from the forbidden period to the allowed period, the gateway updating parameters of a periodic beacon superframe, and broadcasting a first configuration parameter and a second configuration parameter in the parameters of the periodic beacon superframe, so as to respectively adjust an SD and a BI of the periodic beacon superframe; and when the first communication network is changed from the allowed period to the forbidden period, the gateway updating the parameters of the periodic beacon superframe, and broadcasting a third configuration parameter and a fourth configuration parameter in the parameters of the periodic beacon superframe, so as to respectively adjust the SD and the BI of the periodic beacon superframe.

4. A gateway, applicable to connecting a first communication network and at least one machine-to-machine (M2M) communication device of a second communication network, comprising:

a first communication protocol module, connected to the first communication network, and connected to an M2M communication server via the first communication network;

a second communication protocol module, connected to the second communication network; and a synchronizer, connected to the first communication protocol module and the second communication protocol module, configured for determining whether the first communication network is in an allowed period or a forbidden period, and according to the determination result, via the second communication protocol module, adaptively adjusting a ratio of a superframe duration (SD) to a beacon interval (BI) of a periodic beacon of the second communication network, or adaptively adjusting a polling rate of the at least one M2M communication device of the second communication network, when the gateway operates in a beacon mode of the second communication network, the synchronizer, according to whether the first communication network is in the allowed period or the forbidden period, adaptively adjusts the ratio of the SD to the BI of the periodic beacon via the second communication protocol module; and when the gateway operates in a non-beacon mode of the second communication network, the synchronizer, according to whether the first communication network is in the allowed period or the forbidden period, adaptively adjusts the polling rate of the at least one M2M communication device of the second communication network via the second communication protocol module.

5. The gateway of claim 4, wherein:

when the gateway operates in the beacon mode and the first communication network is in the allowed period, the synchronizer, via the second communication protocol module, broadcasts a first configuration parameter and a second configuration parameter configured for respectively adjusting the SD and the BI of the periodic beacon, so that the SD occupies a first portion in the BI, wherein the second configuration parameter is configured for adjusting the BI to be matched with the allowed period; and when the gateway operates in the beacon mode and the first communication network is in the forbidden period, the synchronizer, via the second communication protocol module, broadcasts a third configuration parameter and a fourth configuration parameter configured for respectively adjusting the SD and the BI of the periodic beacon, so that the SD occupies a second portion in the BI, wherein the fourth configuration parameter is configured for adjusting the BI to be matched with the forbidden period, wherein the first portion in the BI is larger than the second portion in the BI.

6. The gateway of claim 4, wherein:

when the gateway operates in the beacon mode and is originally in a power saving (PS) state, the second communication protocol module executes a tracking area update (TAU) procedure of the first communication network, and the synchronizer controls the second communication protocol module to be switched from the PS state to an active state.

7. The gateway of claim 4, wherein:

when the gateway operates in the beacon mode and when the first communication network is changed from the forbidden period to the allowed period, the synchronizer controls the second communication protocol module to update parameters of a periodic beacon superframe, and broadcast a first configuration parameter and a second configuration parameter in the parameters of the periodic beacon superframe, wherein first configuration parameter and the second configuration parameter are configured for respectively adjusting an SD and a BI of the periodic beacon superframe; and when the gateway operates in the beacon mode and when the first communication network is changed from the allowed period to the forbidden period, the synchronizer controls the second communication protocol module to update the parameters of the periodic beacon superframe, and broadcast a third configuration parameter and a fourth configuration parameter in the parameters of the periodic beacon superframe, wherein the third configuration parameter and the fourth configuration parameter are configured for respectively adjusting the SD and the BI of the periodic beacon superframe.

8. The gateway of claim 4, wherein:

when the gateway operates in the non-beacon mode and the first communication network is in the allowed period, the synchronizer controls the second communication protocol module to increase the polling rate of the at least one M2M communication device of the second communication network; and when the gateway operates in the non-beacon mode and the first communication network is in the forbidden period, the synchronizer controls the second communication protocol module to decrease the polling rate of the at least one M2M communication device of the second communication network.

9. The gateway of claim 4, wherein:

when a new M2M communication device joins the second communication network to be connected to the gateway, the synchronizer generates synchronization data, and transmits the synchronization data to the new M2M communication device via the second communication protocol module, wherein the synchronization data comprises a Time-to-Next-State parameter, a power saving state polling rate (Rate-PS), and an active state polling rate (Rate-Active).

10. The gateway of claim 4, wherein:
when the gateway is in a power saving (PS) state of the second communication network and after the first communication protocol module executes a periodic TAU procedure of the first communication network, the synchronizer updates a power saving state polling rate or an active state polling rate, and transmits second synchronization data to each of the at least one M2M communication device of the second communication network via the second communication protocol module, so as to switch a PS state of the second communication network to an active state, wherein the second synchronization data comprises: a Time-to-Next-State, a Time-Update-Only flag set as False, a power saving state polling rate, and an active state polling rate.

11. The gateway of claim 4, wherein:
when the first communication network is changed from the allowed period to the forbidden period, the synchronizer updates a power saving state polling rate or an active state polling rate, sets a Time-to-Next-State parameter as an expiration time of the allowed period, and transmits synchronization data to each of the at least one M2M communication device of the second communication network via the second communication protocol module, so as to switch an active state of the second communication network to a power saving (PS) state, wherein the synchronization data comprises: a Time-to-Next-State, a Time-Update-Only flag set as False, a power saving state polling rate, and an active state polling rate.

12. The gateway of claim 4, wherein:
when the gateway is in the forbidden period of the first communication network and a time when the first communication protocol module encounters a non-periodic tracking area update (TAU) of the first communication network is reached, the synchronizer, at an old next periodic TAU time that will be encountered originally when notifying the end of the forbidden period, notifies each of the at least M2M communication device of the second communication network of extending a PS state time of the second communication network until a new next periodic TAU time via the second communication protocol module.

13. The gateway of claim 4, wherein:
when the gateway in the allowed period of the first communication network and the first communication protocol module encounters a non-periodic tracking area update (TAU) procedure of the first communication network, the synchronizer first updates a next periodic TAU time, and when the allowed period is ended, notifies each of the at least one M2M communication device of the second communication network of extending a power saving (PS) state of the second communication network until a new next periodic TAU time via the second communication protocol module.

14. The gateway of claim 4, wherein:
When the second communication protocol module is in a power saving (PS) state and after the first communication protocol module executes a non-periodic tracking area update (TAU) procedure of the first communication network, the synchronizer updates a power saving state polling rate or an active state polling rate, sets a Time-to-Next-State as an expiration time of a new allowed period, transmits second synchronization data to each of the at least one M2M communication device of the second communication network via the second communication protocol module, and maintains the PS state of the second communication network, wherein the synchronization data comprises: a Time-to-Next-State, a Time-Update-Only flag set as True, a power saving state polling rate, and an active state polling rate.

15. An operation method in heterogeneous networks, applicable to a gateway connecting a first communication network and a second communication network, comprising:
when the gateway operates in a beacon mode of the second communication network, the gateway determining whether the first communication network is in an allowed period or a forbidden period, and generating a determination result; and
the gateway, according to the determination result, adaptively adjusting a ratio of a superframe duration (SD) to a beacon interval (BI) of a periodic beacon of the second communication network,
wherein, the gateway is connected to a machine-to-machine (M2M) communication server via the first communication network, and the gateway is connected to at least one M2M communication device via the second communication network,
wherein, the step of adaptively adjusting the ratio of the SD to the BI of the second communication network according to whether the first communication network is in the allowed period or the forbidden period comprises:
when the first communication network is in the allowed period, the gateway increases the SD of the periodic beacon of the second communication network, or decreases the length of the BI of the periodic beacon, wherein the BI is greater than the SD; and
when the first communication network is in the forbidden period, the gateway decrease the length of the SD of the periodic beacon of the second communication network, or increases the length of the BI of the periodic beacon.

16. An operation method in heterogeneous networks, applicable to a gateway connecting a first communication network and a second communication network, comprising:
when the gateway operates in a beacon mode of the second communication network, the gateway determining whether the first communication network is in an allowed period or a forbidden period, and generating a determination result; and
the gateway, according to the determination result, adaptively adjusting a ratio of a superframe duration (SD) to a beacon interval (BI) of a periodic beacon of the second communication network,
wherein, the gateway is connected to a machine-to-machine (M2M) communication server via the first communication network, and the gateway is connected to at least one M2M communication device via the second communication network,
wherein the step of adaptively adjusting the ratio of the SD to the BI of the periodic beacon of the second communication network comprises:
when the first communication network is in the allowed period, the gateway broadcasts a first configuration parameter and a second configuration parameter for respectively adjusting the SD and the BI of the periodic beacon, so that the SD occupies a first portion in the BI, wherein the second configuration parameter is configured for adjusting the BI to be matched with the allowed period; and when the first communication network is in the forbidden period, the gateway broadcasts a third configuration parameter and a fourth configuration parameter for respectively adjusting the SD and the BI of the periodic beacon, so that the SD occupies a second portion in the BI, wherein the fourth configuration parameter is configured for adjusting the BI to be matched with the forbidden period, wherein the first portion in the BI is greater than the second portion in the BI.

17. An operation method in heterogeneous networks, applicable to a gateway connecting a first communication network and a second communication network, comprising:

when the gateway operates in a beacon mode of the second communication network, the gateway determining whether the first communication network is in an allowed period or a forbidden period, and generating a determination result; and the gateway, according to the determination result, adaptively adjusting a ratio of a superframe duration (SD) to a beacon interval (BI) of a periodic beacon of the second communication network, wherein, the gateway is connected to a machine-to-machine (M2M) communication server via the first communication network, and the gateway is connected to at least one M2M communication device via the second communication network, wherein the operation method in heterogeneous networks further comprises:

when the gateway is originally in a power saving (PS) state and executes a tracking area update (TAU) procedure of the first communication network, switching the gateway and the at least one M2M communication device of the second communication network from the PS state to an active state; and when the gateway is originally in the active state and an allowed period is expired, switching the gateway and the at least one M2M communication device of the second communication network from the active state to the PS state.

\* \* \* \* \*